(12) United States Patent
Kim

(10) Patent No.: US 12,547,182 B2
(45) Date of Patent: Feb. 10, 2026

(54) METHOD AND DEVICE FOR MANAGING CONTROL AUTHORITY OF VEHICLE

(71) Applicants: Hyundai Motor Company, Seoul (KR); Kia Corporation, Seoul (KR)

(72) Inventor: Yun Sik Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 246 days.

(21) Appl. No.: 18/529,496

(22) Filed: Dec. 5, 2023

(65) Prior Publication Data

US 2024/0377834 A1    Nov. 14, 2024

(30) Foreign Application Priority Data

May 8, 2023    (KR) .......................... 10-2023-0058940

(51) Int. Cl.
| | |
|---|---|
| *G05D 1/227* | (2024.01) |
| *B60W 30/06* | (2006.01) |
| *B60W 30/09* | (2012.01) |
| *B60W 50/14* | (2020.01) |
| *G05D 1/222* | (2024.01) |

(52) U.S. Cl.
CPC ........... *G05D 1/2279* (2024.01); *B60W 30/06* (2013.01); *B60W 30/09* (2013.01); *B60W 50/14* (2013.01); *G05D 1/222* (2024.01); *B60W 2520/10* (2013.01); *B60W 2552/05* (2020.02); *B60W 2556/45* (2020.02); *B60W 2720/106* (2013.01)

(58) Field of Classification Search
CPC ...... B60W 30/06; B60W 30/09; B60W 50/14; G05D 1/2279; G05D 1/222
See application file for complete search history.

(56) References Cited

U.S. PATENT DOCUMENTS

| | | | |
|---|---|---|---|
| 2021/0080949 A1* | 3/2021 | Takeda ..................... | B62D 1/06 |
| 2024/0051578 A1* | 2/2024 | Ko ..................... | B60W 50/0205 |
| 2025/0128699 A1* | 4/2025 | Lee ................... | B60W 60/0021 |

* cited by examiner

*Primary Examiner* — Luke Huynh
(74) *Attorney, Agent, or Firm* — Banner & Witcoff, Ltd.

(57) ABSTRACT

A method and a device for managing a control authority of a vehicle are disclosed. The method may include: based on an event in which an autonomous driving operation is not feasible, transmitting, to a first user terminal having an administrative control authority associated with the vehicle, a request message including an indication for a first user of the first user terminal to select a subject to take over a control authority of the vehicle while the first user is not present in the vehicle; acquiring a restriction policy for manual driving of the vehicle by a second user, wherein the second user other than the first user is selected as the subject to take over the control authority; and controlling, based on a limited control authority granted to the second user, a maneuver of the vehicle within a range indicated by the restriction policy.

20 Claims, 15 Drawing Sheets

METHOD AND DEVICE FOR MANAGING CONTROL AUTHORITY OF VEHICLE

CROSS REFERENCE TO RELATED APPLICATION

The present application claims priority to Korean Patent Application No. 10-2023-0058940, filed on May 8, 2023, the entire contents of which is incorporated herein by reference.

TECHNICAL FIELD

The present disclosure relates to a method and a device for managing a control authority of a vehicle.

BACKGROUND

The content described below merely provides background information related to the present disclosure and does not constitute the related art.

When a situation requiring transfer of control authority during autonomous driving of a vehicle occurs (e.g., a transition demand situation, hereinafter referred to as a TD situation), the occupant may need to take over the control authority. However, if a TD situation occurs in a state where there are no occupants capable of driving the vehicle, control authority of the vehicle cannot be transferred immediately. For example, if a TD situation occurs while the vehicle is performing remote parking pilot (RPP), immediate transfer of control authority is not available because there is no occupant in the vehicle.

SUMMARY

A feature of the disclosure is to provide a method and apparatus for coping with a TD situation even when a person having authority over a vehicle (e.g., an owner, etc.) is not on board.

According to an aspect of the present disclosure provides a method performed by a device mounted on a vehicle. The method includes requesting a first user terminal, which is a terminal of a first user who has authority over the vehicle, to select a subject to take over a control authority of the vehicle when a transition demand (TD) situation occurs while the first user is not riding in the vehicle, acquiring a restriction policy for manual driving of a second user when the second user other than the first user is selected as the subject to take over the control authority, and controlling a maneuver of the vehicle so that the manual driving of the second user is permitted only within a range limited by the restriction policy.

According to another aspect of the present disclosure provides an apparatus including a memory to store instructions, and at least one processor. The at least one processor, when executed by the instructions, requests a first user terminal, which is a terminal of a first user who has authority over the vehicle, to select a subject to take over a control authority of the vehicle when a transition demand (TD) situation occurs while the first user is not riding in the vehicle, acquires a restriction policy for manual driving of a second user when the second user other than the first user is selected as the subject, and controls a maneuver the vehicle so that the manual driving of the second user is permitted only within a range limited by the restriction policy.

According to another aspect of the present disclosure provides a method performed by a terminal of a first user. The method includes receiving a message notifying that a transition demand (TD) situation is occurred from a vehicle, receiving a selection of a subject to take over a control authority of the vehicle from the first user, and receiving a restriction policy for manual driving of a second user from the first user when the second user other than the first user is selected as the subject to take over the control authority, wherein the first user is a person who has authority over the vehicle and is not riding in the vehicle.

A method, performed by a device mounted on a vehicle, may comprise: based on an event in which an autonomous driving operation is not feasible, transmitting, to a first user terminal having an administrative control authority associated with the vehicle, a request message, wherein the request message comprises an indication for a first user of the first user terminal to select a subject to take over a control authority of the vehicle while the first user is not present in the vehicle; acquiring a restriction policy for manual driving of the vehicle by a second user, wherein the second user other than the first user is selected as the subject to take over the control authority; and controlling, based on a limited control authority granted to the second user and based on a determination that the second user is present in the vehicle, a maneuver of the vehicle within a range indicated by the restriction policy.

The method may further comprise storing, in a memory of the vehicle, information of the second user, wherein the second user is a manager of a parking lot where the vehicle is located or a deputy driver within a preset distance from the vehicle, and wherein the information of the second user comprises an indication that the second user is one of at least one candidate driver for whom a limited control authority associated with the vehicle can be granted.

The event may comprise a situation in which autonomous parking or autonomous vehicle exit of the vehicle is unavailable or not feasible.

The restriction policy may comprise a policy permitting driving of the vehicle by the second user within an area set by the first user.

The controlling the maneuver of the vehicle may comprise: stopping the vehicle when the vehicle leaves the set area; and transmitting, to the first user terminal, a message indicating that the vehicle is leaving the area. The controlling the maneuver of the vehicle may further comprise releasing forced stop of the vehicle when receiving a message permitting the vehicle to leave the area from the first user terminal.

The controlling the maneuver of the vehicle may comprise: controlling an internal display device of the vehicle to display a message indicating that the vehicle leaves the set area. The controlling the maneuver of the vehicle may further comprise blinking an emergency light of the vehicle until a message permitting the vehicle to leave the area is received.

The acquiring the restriction policy may comprise receiving, from the first user terminal, a movement range restriction policy from among a plurality of candidate movement range restriction policies. The plurality of candidate movement range restriction polices may comprise at least one of: a first policy permitting driving of the vehicle by the second user only within a parking lot where the vehicle is currently located; a second policy permitting driving of the vehicle by the second user only within the parking lot and a preset distance from the parking lot; or a third policy that does not limit a range of movement of the vehicle.

The restriction policy may comprise a policy permitting the vehicle to drive only at or below a speed set by the vehicle or a speed indicated by a message received from the first user terminal.

The acquiring the restriction policy may comprise receiving, from the first user terminal, a speed restriction policy from among a plurality of candidate speed restriction policies. The plurality of candidate speed restriction policies comprises at least one of: a first policy permitting driving of the vehicle only at or below a first maximum speed defined according to an internal regulation of a parking lot where the vehicle is currently located; a second policy permitting driving of the vehicle only at or below a predefined second maximum speed; or a third policy that does not limit a speed of the vehicle.

The method may further comprise resuming, based on a second policy and based on a determination that a resumption of autonomous driving of the vehicle is feasible, an autonomous driving operation of the vehicle, wherein the second policy comprises one or more criterions for resuming autonomous driving operation of the vehicle.

The second policy may be set to selectively resume autonomous parking control or autonomous vehicle exit control for the vehicle. The controlling the maneuver of the vehicle may comprise: transmitting, to the first user terminal, a message indicating that the autonomous parking control or autonomous vehicle exit control for the vehicle is able to be resumed; and outputting, based on an authorization message instructing a resumption of the autonomous parking control or autonomous vehicle exit control for the vehicle, a guide message instructing the second user to get off the vehicle.

The resuming the autonomous driving operation of the vehicle may comprise: resuming, based on a determination that the second user is no longer present in the vehicle, the autonomous parking control or autonomous vehicle exit control for the vehicle.

The second policy may be set to activate a driving assistance control function for manual driving of the second user, and the controlling the maneuver of the vehicle may comprise controlling the vehicle to decelerate or stop based on a collision risk while the second user is driving the vehicle.

The acquiring the restriction policy may comprise acquiring an autonomous driving resumption policy from among a plurality of candidate autonomous driving resumption policies. The plurality of candidate autonomous driving resumption polices may comprise at least one of: a first policy selectively resuming autonomous parking control or autonomous vehicle exit control for the vehicle based on an instruction message of the first user terminal; a second policy activating a driving assistance control function for manual driving of the second user; or a third policy maintaining the manual driving of the second user within a range limited by the restriction policy.

The method may further comprise keeping the vehicle in a stopped state based on a message received form the first user terminal. The message indicates that the first user is selected as a subject to take over the control authority of the vehicle.

The keeping the vehicle in the stopped state may comprise: keeping the vehicle in the stopped state after performing, based on a determination that the vehicle is able to be double-parked, autonomous parking control for double-parking; or keeping, based on a determination that the vehicle is unable to be double-parked, the vehicle in the stopped state at a current location.

An apparatus for a vehicle may comprise: at least one processor; and a memory storing instructions that, when executed by the at least one processor, cause the apparatus to: based on an event in which an autonomous driving operation is not feasible, transmit, to a first user terminal having an administrative control authority associated with the vehicle, a request message, wherein the request message comprises an indication for a first user of the first user terminal to select a subject to take over a control authority of the vehicle while the first user is not present in the vehicle; acquire a restriction policy for manual driving of the vehicle by a second user, wherein the second user other than the first user is selected as the subject; and control, based on a limited control authority granted to the second user and based on a determination that the second user is present in the vehicle, a maneuver the vehicle within a range indicated by the restriction policy.

A method performed by a terminal of a first user may comprise: receiving, from a vehicle, a message indicating an event in which an autonomous driving operation is not feasible; receiving, via a user input interface of the terminal of the first user, a selection of a second user as a subject to take over a control authority of the vehicle, wherein the terminal has an administrative control authority associated with the vehicle; receiving, based on the selection of the second user, a restriction policy for manual driving of the vehicle by the second user; and transmitting, to the vehicle, an indication of a limited control authority that authorizes a maneuver of the vehicle, wherein the maneuver of the vehicle is associated with the manual driving while the second user is present in the vehicle.

The restriction policy comprises a policy permitting driving of the vehicle only within an area set by the first user. The method may further comprises receiving, from the vehicle, a first message indicating that the vehicle leaves the set area. The method may further comprises transmitting, to the vehicle, a second message indicating whether the vehicle is permitted to leave the set area.

The restriction policy may comprise a policy resuming autonomous parking control or autonomous vehicle exit control for the vehicle based on an instruction message of the terminal of the first user. The method may further comprises receiving a message indicating that the autonomous parking control or autonomous vehicle exit control for the vehicle is able to be resumed. The method may further comprises transmitting, to the vehicle, the instruction message indicating whether to resume autonomous parking control or autonomous vehicle exit control for the vehicles.

DETAILED DESCRIPTION

Figure 1:
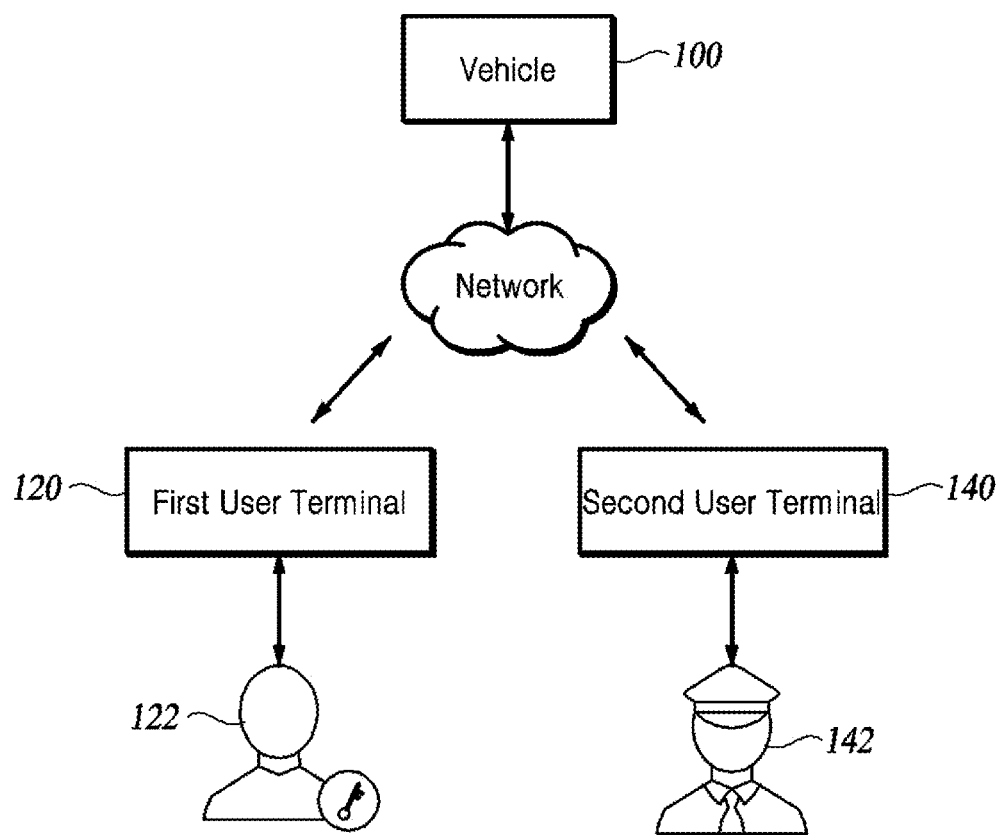
FIG. 1 is a block diagram illustrating an exemplary system to which the disclosure may be applied.

Hereinafter, various examples of the present disclosure will be described in detail with reference to the accompanying drawings. In the following description, like reference numerals preferably designate like elements, although the elements are shown in different drawings. Further, in the following description of some embodiment(s), a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe various aspects of the present disclosure and is not intended to represent the only embodiments in which the present disclosure may be practiced.

FIG. 1 is a block diagram illustrating an exemplary system to which the disclosure may be applied.

As shown in FIG. 1, a system may include all or part of a vehicle 100, a first user terminal 120 and a second user terminal 140. The blocks shown in FIG. 1 are exemplary components, and some blocks may be changed or deleted, or other blocks may be added.

A vehicle 100 may be a vehicle capable of autonomous driving. For example, the vehicle 100 may be a vehicle that drives by itself without a driver's manipulation, but requires the driver's intervention when a transition demand (TD) situation occurs. Here, the TD situation may refer to an event in which an autonomous driving operation is not feasible and/or a situation in which it is difficult to maintain autonomous driving any longer, and may include a situation caused by the inside of the vehicle 100 as well as a situation caused by the outside of the vehicle 100. Situations caused by the outside of the vehicle 100 may include, for example, the presence of obstacles on a driving path or bad weather. The situation caused by the inside of the vehicle 100 may include, for example, sensor contamination or controller failure. The TD situation may include an event in which a transition of the control authority of a vehicle is determined and/or an event for which a transition of the control authority of a vehicle is required.

The first user terminal 120 and the second user terminal 140 may refer to terminals of a first user 122 and a second user 142, respectively. Terminals 120 and 140 may include mobile phones, smart phones, laptop computers, digital broadcast terminals, personal digital assistants (PDAs), portable multimedia players (PMPs), navigation devices, slate PCs, tablet PCs, ultrabooks, or wearable devices (e.g., a smartwatch, a smart glass, a head mounted display (HMD)), or the like, but aspects of the present disclosure are not limited to these examples.

The first user 122 may refer to a person having authority over the vehicle 100. For example, the first user 122 may be the owner of the vehicle 100. As another example, the first user 122 may be a person with authority equivalent to that of the owner, such as the owner's family. As another example, the first user 122 may be a renter who rents the vehicle 100 for a certain period of time or a person with authority equivalent to that of the renter.

The second user 142 may refer to a person who is temporarily granted (or may receive) authority over the vehicle 100 from the first user 122. For example, the second user 142 may be a deputy driver, a passenger of the vehicle (e.g. a passenger of an autonomous driving vehicle), a police officer, etc. As another example, the second user 142 may be a predetermined third party, such as a parking attendant or a parking lot manager.

The first user 122 may grant temporary authority over the vehicle 100 to the second user 142 in order to entrust the second user 142 with a predetermined task. For example, if a TD situation occurs while the vehicle 100 is performing remote parking pilot (RPP), the first user 122 may entrust the second user 142 with valet parking instead of moving to the vehicle 100 for driving the vehicle 100. In this case, the first user 122 may grant temporary authority over the vehicle 100 to the second user 142 so that the second user 142 may drive the vehicle 100. If the task entrusted to the second user 142 is completed or the TD situation is resolved, the authority granted to the second user 142 may be revoked. The vehicle 100 may communicate with one or more computing devices via a network to determine whether the temporary authority can be granted to the second user. For example, the vehicle may communicate with one or more servers associated a department of motor vehicle, an issurance company, a police department, and/or a court. The vehicle may verify various pieces of information, such as the driver license information of the second user, the driving record of the second user, traffic violation records, insurance premium information associated with the second user, insurance policy information associated with the second user, etc. Such information may be used to determine the scope of the temporary authority over the vehicle 100. The identity of the second user may be authenticated by using one or more sensors (e.g., using one or more cameras of the vehicle to capture a face of the second user and an ID of the second user, such as a driver's license).

The first user 122 may grant authority over the vehicle 100 to the second user 142 through the first user terminal 120. To this end, applications for granting authority and receiving authority may be installed on the first user terminal 120 and the second user terminal 140, respectively. The first user 122 may grant the second user 142 administrative authority (e.g., full authority, administrative control authority) or limited authority over the vehicle 100. If the second user 142 with limited authority manually drives the vehicle 100, the vehicle 100 may recognize surrounding environment information and override the control authority when a dangerous event occurs.

The first user 122 may set the range of authority to be granted to the second user 142 in advance through an application installed in the first user terminal 120. For example, the first user 122 may set a geographical range, a speed range, an acceleration range, a condition for revoking authority granted to the second user 142, and/or a condition for activating various functions installed on the vehicle 100. If authority setting by the first user 122 is completed, authority to lock/unlock the doors of the vehicle 100 and authority to operate the vehicle 100 may be granted to the second user 142. For example, a digital key may be delivered to the second user terminal 140. The authorized second user 142 may unlock and open the door of the vehicle 100 by using the second user terminal 140, and drive the vehicle 100. While the second user 142 manually drives the vehicle 100, the authority may be limited according to the item(s) restricted by the first user 122.

Hereinafter, as a case in which temporary authority needs to be granted to the second user 142, a case in which a TD situation occurs while the vehicle 100 performs remote autonomous parking will be described as an example. However, it should be noted that the technical idea of the disclosure may also be applied to various other situations in which it is necessary to temporarily grant authority to a third party for operating the vehicle 100 without departing from the substantial technical concepts.

Figure 2:
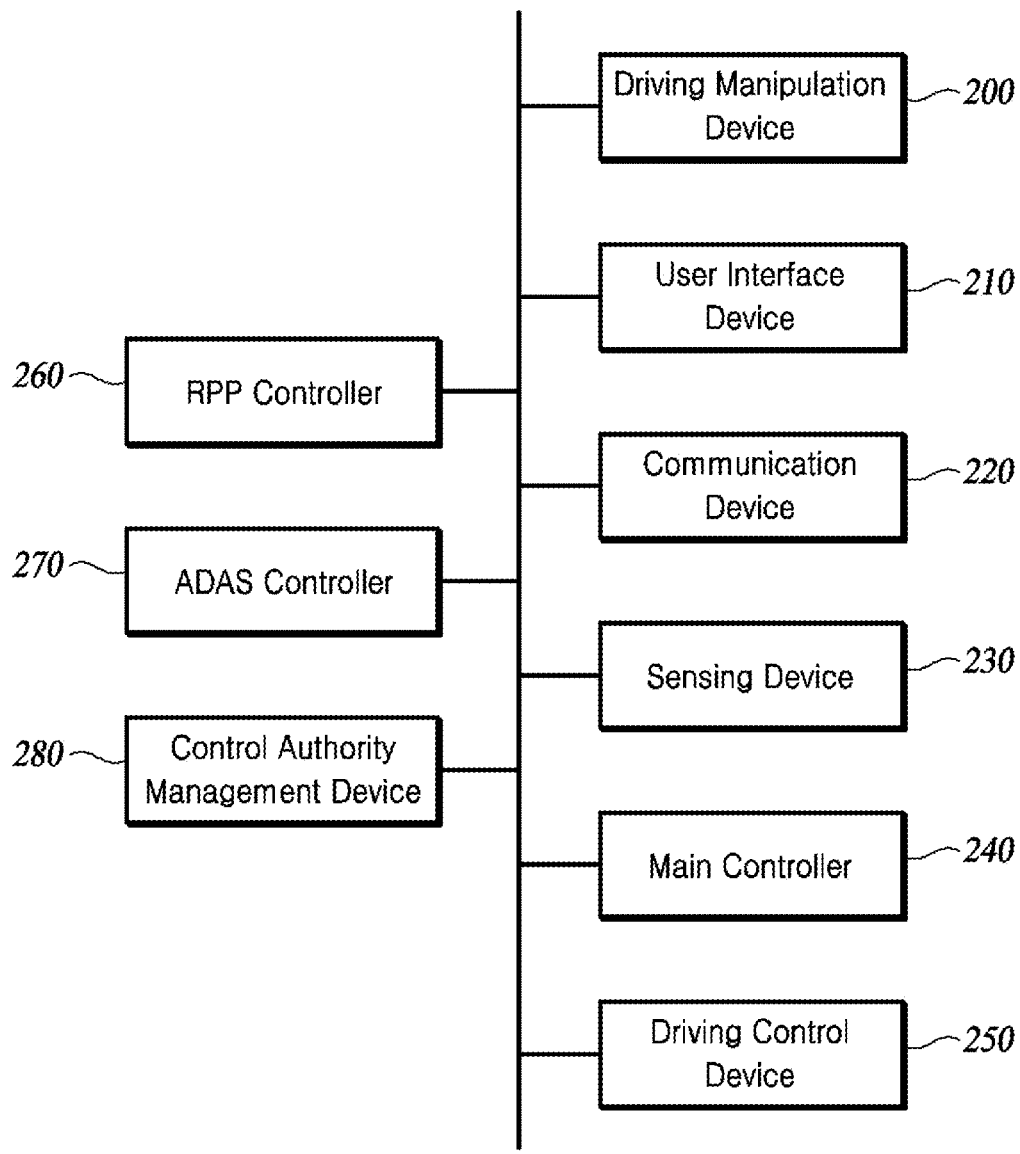
FIG. 2 is a block diagram schematically illustrating a vehicle.

FIG. 2 is a block diagram schematically illustrating a vehicle.

Referring to FIG. 2, a vehicle 100 may include all or part of a driving manipulation device 200, a user interface device 210, a communication device 220, a sensing device 230, a main controller 240, and a driving control device 250, an RPP controller 260, an advanced driver assistance systems (ADAS) controller 270, and a control authority management device 280. The blocks shown in FIG. 2 are exemplary components, and some blocks may be changed or deleted, or other blocks may be added.

The components of the vehicle 100 may exchange electrical signals via an internal communication system (not shown). The electrical signals may include data. The internal communication system may use at least one communication protocol (e.g., controller area network (CAN), local interconnect network (LIN), FlexRay, mobile open systems technologies (MOST), Ethernet, etc.). Each of the components of the vehicle 100 may be implemented as an electronic device that generates an electrical signal and exchanges electrical signals with each other. Meanwhile, the components shown in FIG. 2 represent functionally distinguished components, and may be implemented in a form in which at least one component is integrated with each other in a physical environment.

The driving manipulation device 200 may be a device that receives a user input for driving. In a manual driving mode, the vehicle 100 may be driven based on a driver's operation through the driving manipulation device 200. The driving manipulation device 200 may include a steering input device (e.g., a steering wheel), an acceleration input device (e.g., an accelerator pedal), and a brake input device (e.g., a brake pedal).

The user interface device 210 may be a device for communication between the vehicle 100 and occupants. The user interface device 210 may receive a predetermined input from occupants and/or provide information generated in the vehicle 100 to the occupants. To this end, the interface device 130 may include an input device and/or an output device.

The input device may be implemented as, but is not limited to, at least one physical button, a touch panel and/or a microphone, and it may also be implemented in other ways as long as they receive predetermined information from the occupant. According to some examples, the input device may be combined with the output device to be implemented as a touch display or the like.

The output device may be implemented as, but is not limited to, a display that visually provides information generated in the vehicle 100, a speaker that audibly provides information generated in the vehicle 100, and/or a vibration module that tactually provides information generated in the vehicle 100, and it may also be implemented by other configurations as long as they can provide information generated in the vehicle 100.

The communication device 220 may be a device for communication with an external device. The external device may be the first user terminal 120, the second user terminal 140, and/or a server (not shown). The communication device 220 may communicate with the external device using a wireless communication method. To this end, the communication device 220 may include at least one of a transmission antenna, a reception antenna, a radio frequency (RF) circuit capable of implementing various communication protocols, and an RF element.

The sensing device 230 may be a device for generating information on an object outside the vehicle 100 and/or sensing an internal state of the vehicle 100.

The information on an object outside the vehicle 100 may include, for example, at least one of information on the presence or absence of an object, location information of an object, distance information between the vehicle 100 and an object, and relative speed information between the vehicle 100 and an object. The sensing device 230 may include at least one sensor capable of detecting an object outside the vehicle 100. For example, the sensing device 230 may include at least one of a camera, a radar, a LiDAR, an ultrasonic sensor, and an infrared sensor.

The internal state of the vehicle 100 may include a speed of vehicle 100 or a current location of vehicle 100. To this end, the sensing device 230 may include a wheel sensor, a speed sensor, and/or a position module. The position module may include a global positioning system (GPS) module for receiving GPS information.

The internal state of the vehicle 100 may include the posture, direction, position, angle, acceleration, slope, steering wheel rotating angle, collision information, tire information, lamp information, internal temperature, internal humidity, and external illuminance of the vehicle 100. To this end, the sensing device 230 may include one or more of a posture sensor, an inclination sensor, a weight sensor, a heading sensor, a yaw sensor, a gyro sensor, a steering sensor, a collision sensor, a tire sensor, a vehicle internal temperature sensor, a vehicle internal humidity sensor, an ultrasonic sensor, and an illuminance sensor. For another example, the internal state of the vehicle 100 may include for a remaining battery level, a remaining fuel level of the vehicle 100, and/or a state indicating whether a door is opened or closed and/or a state indicating whether the door is locked. To this end, the first sensing unit 100 may include one or more of a battery sensor, a fuel sensor and/or a door sensor.

The sensing device 230 may include, but is limited to, a processor for processing data output by one or more sensors to generate information on an object and/or information on an internal state of the vehicle 100. In another example, the above-described functions may be performed by a main controller 240, an RPP controller 260, and/or a control authority management device 280.

The main controller 240 may control overall operations of at least one electronic device included in the vehicle 100. The main controller 240 may include one or more processors and one or more memories. The main controller 240 may be referred to as, for example, an electronic control unit (ECU) or any other controllers.

The driving control device 250 may control operations of various driving devices related to the maneuver of the vehicle 100, such as steering, braking, and/or transmission shifting of the vehicle 100. The driving control device 250 may include, for example, a braking controller, a shift controller, a steering controller, a lamp controller, and/or a door controller. The driving control device 250 may include one or more processors. In an example, each component of the driving control device 250 may individually include a processor. The driving control device 250 may control the driving device based on signals received from other electronic devices in the vehicle. For example, the driving control device 250 may control a power train, a steering device, and/or a brake based on the signal received from the RPP controller 260. As another example, the driving control device 250 may control a brake, an emergency light, and/or a door based on the signal received from the control authority management device 280. A method of controlling the operation of various devices related to the maneuver of the vehicle 100 based on the signal received by the driving control device 250 may be performed by known methods, and thus a detailed description thereof will be omitted.

The RPP controller 260 may perform autonomous parking and/or autonomous exit of the vehicle 100. The RPP controller 260 may include, for example, one or more processors and one or more memories. In some implementations, if the RPP controller 260 is implemented in software, the functions of the RPP controller 260 may be performed by the main controller 240.

The RPP controller 260 may operate in an autonomous parking mode or an autonomous vehicle exit mode. For example, as the RPP controller 260 receives a parking request from the first user terminal 120 through the communication device 220, the RPP controller 260 may initiate the autonomous parking mode. As another example, as the RPP controller 260 receives a vehicle exit request from the first user terminal 120 through the communication device 220, the RPP controller 260 may initiate the autonomous vehicle exit mode. As another example, the RPP controller 260 may initiate the autonomous parking mode upon detecting the user's getting off the vehicle 100 at a parking lot entrance through the sensing device 230. The RPP controller 260 may generate a path for autonomous parking and/or autonomous vehicle exit using the sensing data acquired through the sensing device 230 and/or a high-definition map of the parking lot. For example, the RPP controller 260 may search for available parking spaces in a parking lot based on the sensing data and/or the high-definition map. The vehicle 100 may generate a path for searching the parking lot or a path for reaching the searched available parking space. As another example, the RPP controller 260 may generate a path for reaching the parking location set by the first user 122. As another example, the RPP controller 260 may generate a path from a location where the vehicle 100 is parked to an entrance (or exit) of a parking lot. The RPP controller 260 may generate a driving plan for driving along the generated path. The RPP controller 260 may generate a signal for controlling the movement of the vehicle 100 according to the driving plan. The RPP controller 260 may provide the generated signal to the driving control device 250.

The ADAS controller 270 may assist manual driving through the driving manipulation device 200. The ADAS controller 270 may include, for example, one or more processors and one or more memories. In some implementations, if the ADAS controller 270 is implemented in software, the functions of the ADAS controller 270 may be performed by the main controller 240.

The ADAS controller 270 may implement at least one advanced driver assistance system (ADAS) function. The ADAS functions may include forward collision-avoidance warning (FCA) function and/or autonomous emergency braking (AEB) function. The ADAS function may further include at least one of adaptive cruise control (ACC), forward collision warning (FCW), lane keeping assist (LKA), lane change assist (LCA), target following assist (TFA), blind spot detection (BSD), high beam assist (HBA), pedestrian collision warning system (PD collision warning system), traffic sign recognition (TSR), traffic sign assist (TSA), night vision (NV), driver status monitoring (DSM) and traffic jam assist (TJA). Some known driving assistance functions implemented by the ADAS controller 270 may be used, and a detailed description thereof will be omitted.

The control authority management device 280 may transfer all or part of the authority over the vehicle 100 according to the occurrence of the TD situation, and revoke all or part of the authority over the vehicle 100 according to the resolution of the TD situation. The control authority management device 280 may include, for example, one or more processors and one or more memories. In some implementations, if the control authority management device 280 is implemented in software, the function of the control authority management device 280 may be performed by the main controller 240.

The control authority management device 280 may transfer the control authority of the vehicle 100 to the first user 122 or the second user 142 when a TD situation occurs in the autonomous parking mode or the autonomous vehicle exit mode.

The control authority management device 280 may detect the occurrence of a TD situation based on the signal received from the sensing device 230, main controller 240, driving control device 250 and/or RPP controller 260.

The TD situation may include a case in which autonomous parking or autonomous vehicle exit is not available or not feasible due to the state of the vehicle 100. As an example, the TD situation may include a case where a sensor (e.g., a camera, an ultrasonic sensor, a LIDAR, a radar), which is used to detect an external object, is out of order or is blocked (e.g., covered) by foreign substances so that the sensor cannot normally sense surrounding environments. As another example, the TD situation may include a case where the normal operation of a logic is unavailable or not feasible as the RPP controller 260 is turned off or reset. As another example, the TD situation may include a case where normal control of the vehicle is unavailable or not feasible due to failure determination of the RPP driving function, braking function and/or shifting function.

The TD situation may include a case in which it is unavailable or not feasible to generate a driving path for autonomous parking or autonomous vehicle exit and/or to follow the generated driving path due to external environment of the vehicle 100.

Figure 3:
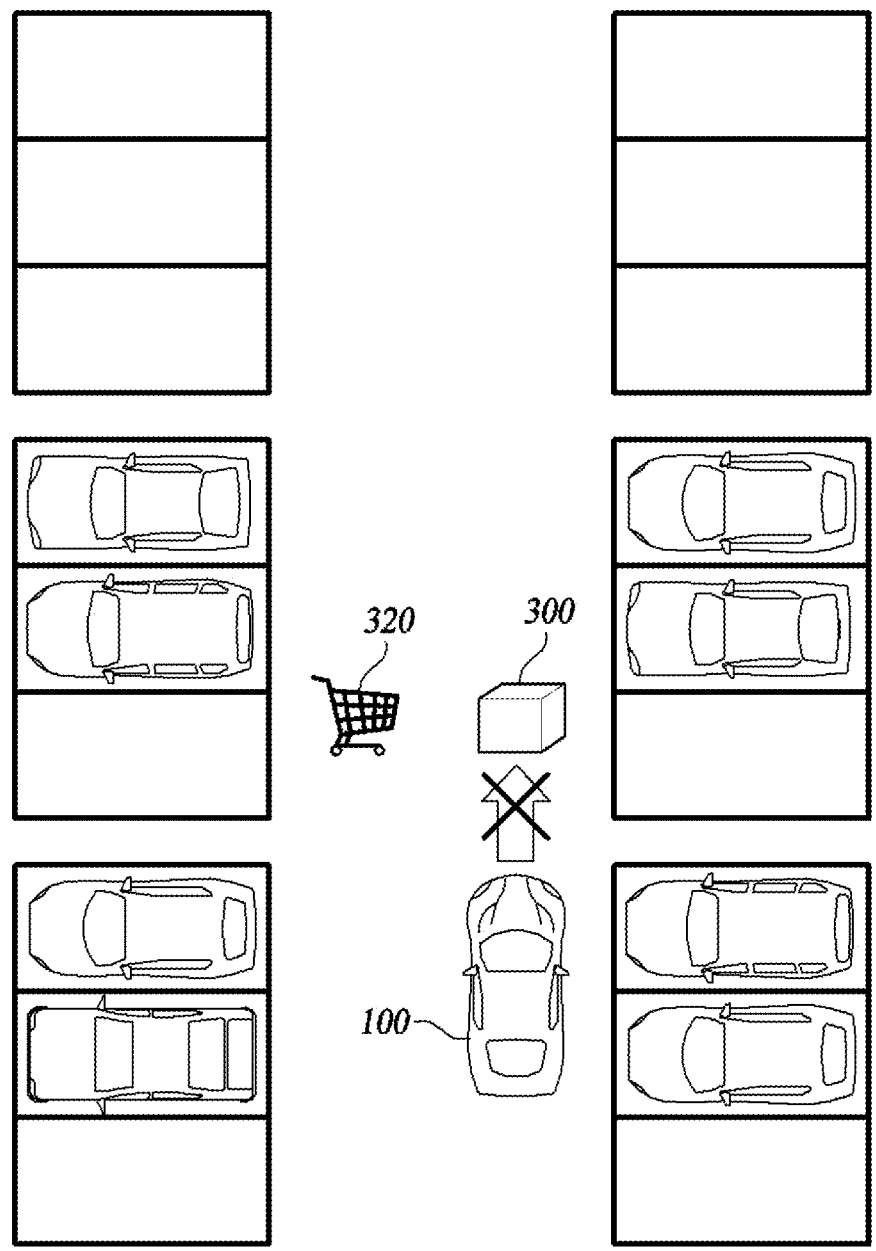
FIGS. 3 to 5 are exemplary diagrams for describing a transition demand (TD) situation.
Figure 4:
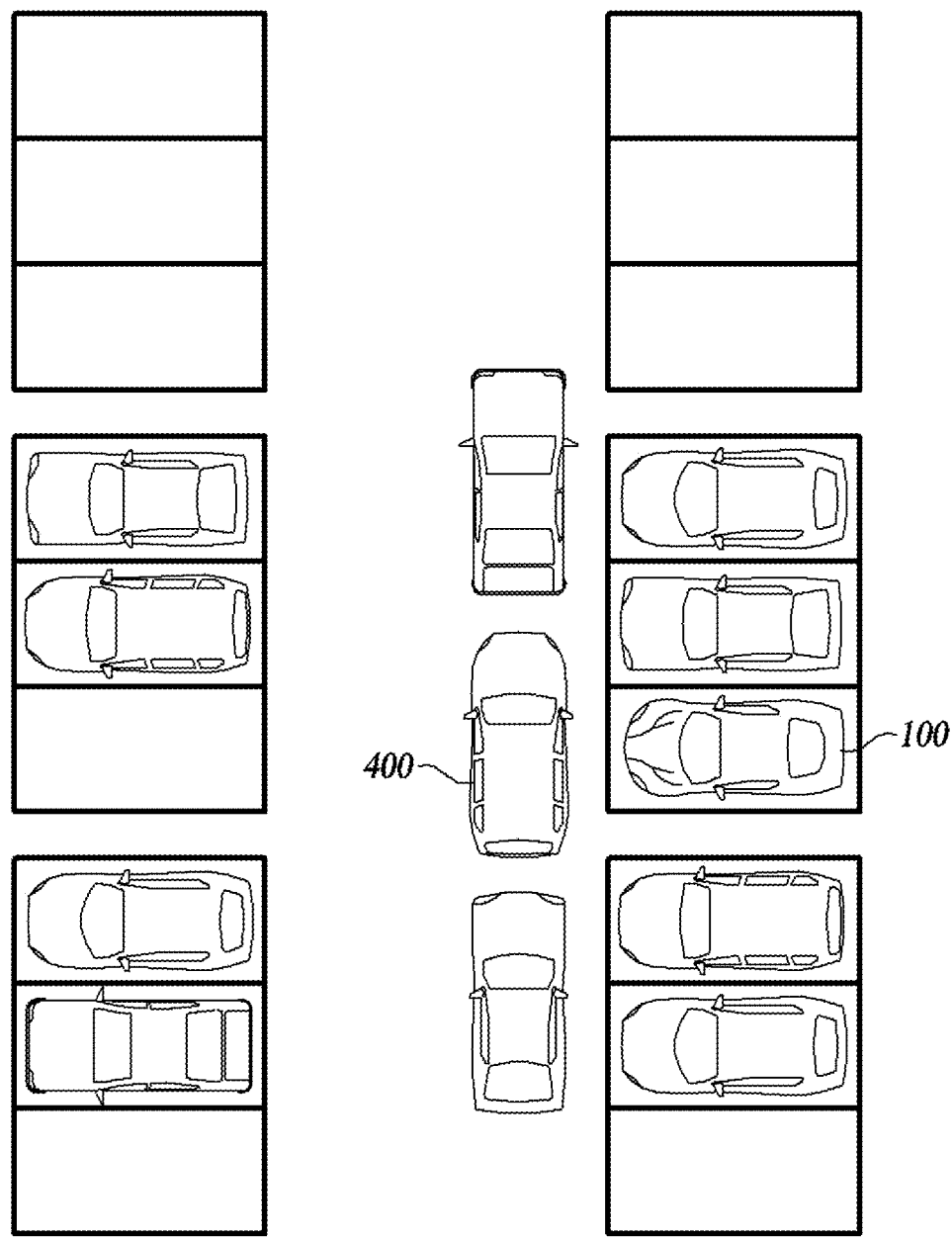
Figure 5:
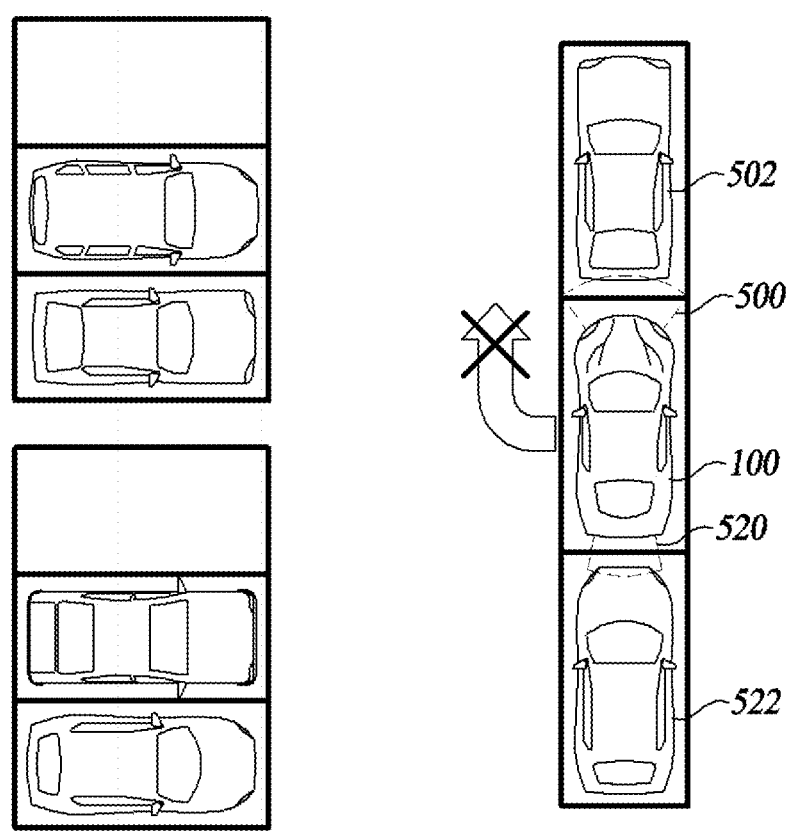

FIGS. 3 to 5 are exemplary diagrams for describing a TD situation. For example, as shown in FIG. 3, the TD situation may include a case in which the stopped state of the vehicle 100 continues for a predetermined time or more due to obstacles 300 and 320 existing near the driving path. As another example, the TD situation, as shown in FIG. 4, may include a case where the vehicle 100 cannot exit from the parking spot due to another vehicle 400 parked at a backside road. As another example, the TD situation, as shown in FIG. 5, may include a case where obstacles 502 and 522 are present within a minimum sensing distance 500 of a front sensor and/or a minimum sensing distance 520 of a rear sensor, and thus the vehicle 100 cannot be moved.

If a TD situation occurs, the control authority management device 280 may transmit a message requesting selection of a subject to take over control authority of the vehicle 100 to the first user terminal 120 through the communication device 220. Based on the selection of the first user 122, the control authority management device 280 may transfer control authority to the first user 122 or the second user 142 who has temporarily delegated authority over the vehicle 100 from the first user 122.

If the second user 142 other than the first user 122 is selected as the subject to which control authority is transferred, the control authority management device 280 may acquire a restriction policy for manual driving of the second user 142. For example, the control authority management device 280 may receive a restriction policy set by the first user from the first user terminal 120 through the communication device 220. For example, the control authority management device 280 may acquire information indicating a selection by the first user 122 among a plurality of restriction policies from the first user terminal 120.

Table 1 illustrates a restriction policy for the manual driving of the second user 142.

parking lot and a preset distance (e.g., within 50 m) from the parking lot. Additionally or alternatively, the plurality of movement range restriction policies may include a third movement range restriction policy that does not limit a range in which the second user 142 may move the vehicle 100.

The vehicle speed restriction policy may include a maximum speed permitted when the second user 142 manually drives. The first user 122 may limit the authority of the second user 142 so that the second user 142 drives the vehicle 100 only at a predetermined vehicle speed or less, thereby preventing the second user 142 from dangerously driving the vehicle 100.

The first user 122 may select a vehicle speed restriction policy to be applied to the second user 142 from among a plurality of predefined vehicle speed restriction policies. For example, the plurality of vehicle speed restriction polices may include a first vehicle speed restriction policy that permits driving of the vehicle 100 only at or below a first maximum speed defined according to internal regulations of the parking lot where the vehicle is currently located. Additionally or alternatively, the plurality of vehicle speed restriction policies may include a second vehicle speed restriction policy permitting the vehicle 100 to drive only at or below a predefined second maximum speed. The second maximum speed may be a speed previously defined by the first user 122 or the manufacturer of the vehicle 100. Additionally or alternatively, the plurality of vehicle speed

TABLE 1

| Policy | Set Value | Note |
| --- | --- | --- |
| Movement range restriction policy | Limited to inside a parking lot | Driving is permitted only within a parking lot where a vehicle is currently located |
|  | Outside a parking lot ( )m | Driving is permitted only within a predetermined distance from a parking lot |
|  | No limit | — |
| Vehicle speed restriction policy | Follow internal regulation of parking lot | — |
|  | V1 [km/h] or less | Limit to preset first maximum speed or less |
|  | V2 [km/h] or less | Limit to preset second maximum speed or less |
|  | No limit | — |
| Countermeasure policy upon resolving TD situation | RPP DDT shifting | Resume autonomous parking control or autonomous vehicle exit control |
|  | RPP OFF maintained | Maintain inactivation |
|  | Brake override | Activate driving assistance function (FCA or AEB) |

Referring to Table 1, the restriction policy may include a movement range restriction policy, a vehicle speed restriction policy, and a countermeasure policy upon resolving a TD situation.

The movement range restriction policy may include a range in which the second user 142 may move the vehicle 100. The first user 122 may limit the authority of the second user 142 to drive the vehicle 100 only within a predetermined area, thereby preventing the vehicle 100 from being stolen.

The first user 122 may select a policy to be applied to the second user 142 from among a plurality of predefined movement range restriction policies. For example, the plurality of movement range restriction policies may include a first movement range restriction policy permitting the second user 142 to drive only within the parking lot where the vehicle 100 is currently located. Additionally or alternatively, the plurality of movement range restriction policies may include a second movement range restriction policy permitting the second user 142 to drive only within the restriction policies may include a third vehicle speed restriction policy that does not limit the maximum speed at which the second user 142 may accelerate the vehicle 100.

A countermeasure policy upon resolving the TD situation (hereinafter referred to as 'countermeasure policy') may include whether the RPP controller 260 and/or the ADAS controller 270 are activated when the TD situation is resolved.

The first user 122 may select a policy to be applied to the second user 142 from among a plurality of predefined countermeasure policies. For example, the plurality of countermeasure policies may include a first countermeasure policy resuming autonomous parking control or autonomous vehicle exit control for the vehicle 100 based on the intention of the first user 122. In this case, the control authority over the vehicle 100 may be transferred from the second user 142 to the RPP controller 260. Additionally or alternatively, the plurality of countermeasure policies may include a second countermeasure policy activating a driving assistance control function for manual driving of the second user 142. In this case, in a specific situation such as a situation in which a collision with an obstacle is anticipated due to the manual driving of the second user 142, the ADAS controller 270 may execute brake override. Additionally or alternatively, the plurality of countermeasure policies may include a third countermeasure policy maintaining a state in which the control authority is transferred to the second user 142 even if the TD situation is resolved. In this case, the second user 142 may continue to drive the vehicle 100 within a range limited by the movement range restriction policy and/or the vehicle speed restriction policy.

The control authority management device 280 may generate a signal for controlling the movement of the vehicle 100 so that manual driving of the second user 142 is permitted only within a range limited by the restriction policy. The control authority management device 280 may provide various types of information related to the movement of the vehicle 100 to the user(s). For example, the control authority management device 280 may provide information on the movement of the vehicle 100 to the first user 122 through the communication device 220. As another example, the control authority management device 280 may provide vehicle information to the second user 142 through the user interface device 210.

Table 2 shows the maneuver of the vehicle 100 according to the movement range restriction policy and the current location of the vehicle 100, and information provided to the first user 122 and the second user 142. In Table 2, when the existing control state is maintained, '-' is indicated.

TABLE 2

| | Movement range restriction policy | | |
|---|---|---|---|
| Set value | Vehicle location | Subject to receive information or to control | Control/display contents |
| Limited to inside a parking lot | Inside a parking lot | — | — |
| | Outside a parking lot | First user | "The vehicle has left the parking lot. Do you permit driving outside the parking lot?" |
| | | Second user | "The vehicle has left the parking lot. When driving outside is permitted, driving is possible." |
| | | Brake | Override (Release override when outside driving is permitted) |
| | | Emergency light | Blinking (Blinking off when outside driving is permitted) |
| 50 m outside a parking lot | Inside a parking lot | — | — |
| | Within 50 m outside a parking lot | First user | "The vehicle is driving outside the parking lot." |
| | Outside 50 m from a parking lot | First user | "The vehicle has moved 50 m outside the parking lot. Do you permit driving outside 50 m?" |
| | | Second user | "The vehicle has moved 50 m from outside the parking lot. When driving outside is permitted, driving is possible." |
| | | Brake | Override (Release override when outside driving is permitted) |
| | | Emergency light | Blinking (Blinking off when outside driving is permitted) |
| No limit | — | — | — |

As shown in Table 2, when the current location of the vehicle 100 moved by the manual driving of the second user 142 is out of the area set by the movement range restriction policy, the control authority management device 280 may forcibly stop the vehicle 100 by executing brake override. The control authority management device 280 may notify the outside that the vehicle 100 is forcibly stopped by blinking the emergency light of the vehicle 100. The control authority management device 280 may notify the second user 142 through the user interface device 210 that the vehicle is stopped due to violation of the movement range restriction policy. The control authority management device 280 may query the first user 122 whether to permit the movement of the vehicle 100 through communication with the first user terminal 120. If the first user 122 permits movement out of the limited range, the control authority management device 280 may release the brake override and blinking of the emergency light.

Table 3 shows the maneuver of the vehicle 100 according to the vehicle speed restriction policy and whether to comply with the policy. In Table 3, when the existing control state is maintained, '-' is indicated.

TABLE 3

| Vehicle speed restriction policy | | |
|---|---|---|
| Set value | Whether to comply | Maneuver of vehicle |
| Limit | Complied | — |
|  | Exceeded | Control vehicle speed with defined maximum speed value |
| No limit | — | — |

As shown in Table 3, if the current speed of the vehicle 100 controlled by the manual driving of the second user 142 exceeds the maximum speed set by the vehicle speed range restriction policy, the control authority management device 280 may control the vehicle 100 to drive at the maximum speed defined by the restriction policy. For example, the control authority management device 280 may set the target speed of the vehicle 100 to the maximum speed defined in the internal regulations of the parking lot. As another example, the control authority management device 280 may set the target speed of the vehicle 100 to a maximum speed predefined by the first user 122 or the manufacturer of the vehicle 100.

Table 4 shows the maneuver of the vehicle 100 according to the countermeasure policy and internal/external situations of the vehicle 100 when the TD situation is resolved, and information provided to the first user 122 and the second user 142. In Table 4, when the existing control state is maintained, '-' is indicated.

TABLE 4

| Countermeasure policy when TD situation is resolved | | | |
|---|---|---|---|
| Set value | Situation | Subject to receive information or to control | Control/display contents |
| RPP DDT shifting | TD situation resolved | First user | "Do you want to resume RPP control?" |
|  |  | Second user | When RPP control resume command is received: "RPP control resumes. Shift to P and get off". |
|  |  | Vehicle maneuver | When RPP control resume command is received and a second user gets off: RPP control resumes |
| Brake override | TD situation resolved and collision anticipated | Second user | "Slow down (or stop) in anticipation of a collision." |
|  |  | Vehicle maneuver | Slow down (or stop) |
| RPP OFF maintained | — | — | — |

As shown in Table 4, when the TD situation is resolved, the control authority management device 280 may resume autonomous parking/exit control or activate driving assistance control according to the countermeasure policy. For example, if the countermeasure policy is set to 'RPP DDT shifting', the control authority management device 280 may send an inquiry message to the first user terminal 122 asking whether to resume control of the RPP controller 260 through communication. If a command to resume control of the RPP controller 260 is received from the first user terminal 120, the control authority management device 280 may output a message guiding to get off the vehicle 100 through the user interface device 210 because autonomous parking control or autonomous vehicle exit control is scheduled to be resumed. The above message may be output to a display inside the vehicle in the form of text and/or may be output in the form of voice. If the second user's getting off is detected, the control authority management device 280 may transmit a signal to resume control to the RPP controller 260. Accordingly, the remote autonomous parking or remote autonomous vehicle exit by the RPP controller 260 may be performed. As another example, if the countermeasure policy is set to 'brake override', the control authority management device 280 may transmit a signal to activate the driving assistance control to the ADAS controller 270. Accordingly, in a specific situation, such as when a collision is anticipated, brake override may be performed by the ADAS controller 270.

Hereinafter, exemplary operations of the vehicle 100 and/or user terminals 120 and 140 when a TD situation occurs will be described with reference to FIGS. 6 to 13. In the following description, operations described as being performed by the vehicle 100 may be understood as being controlled by the RPP controller 260 and/or the control authority management device 280 in FIG. 2, but aspects of the present disclosure are not limited thereto.

Figure 6:
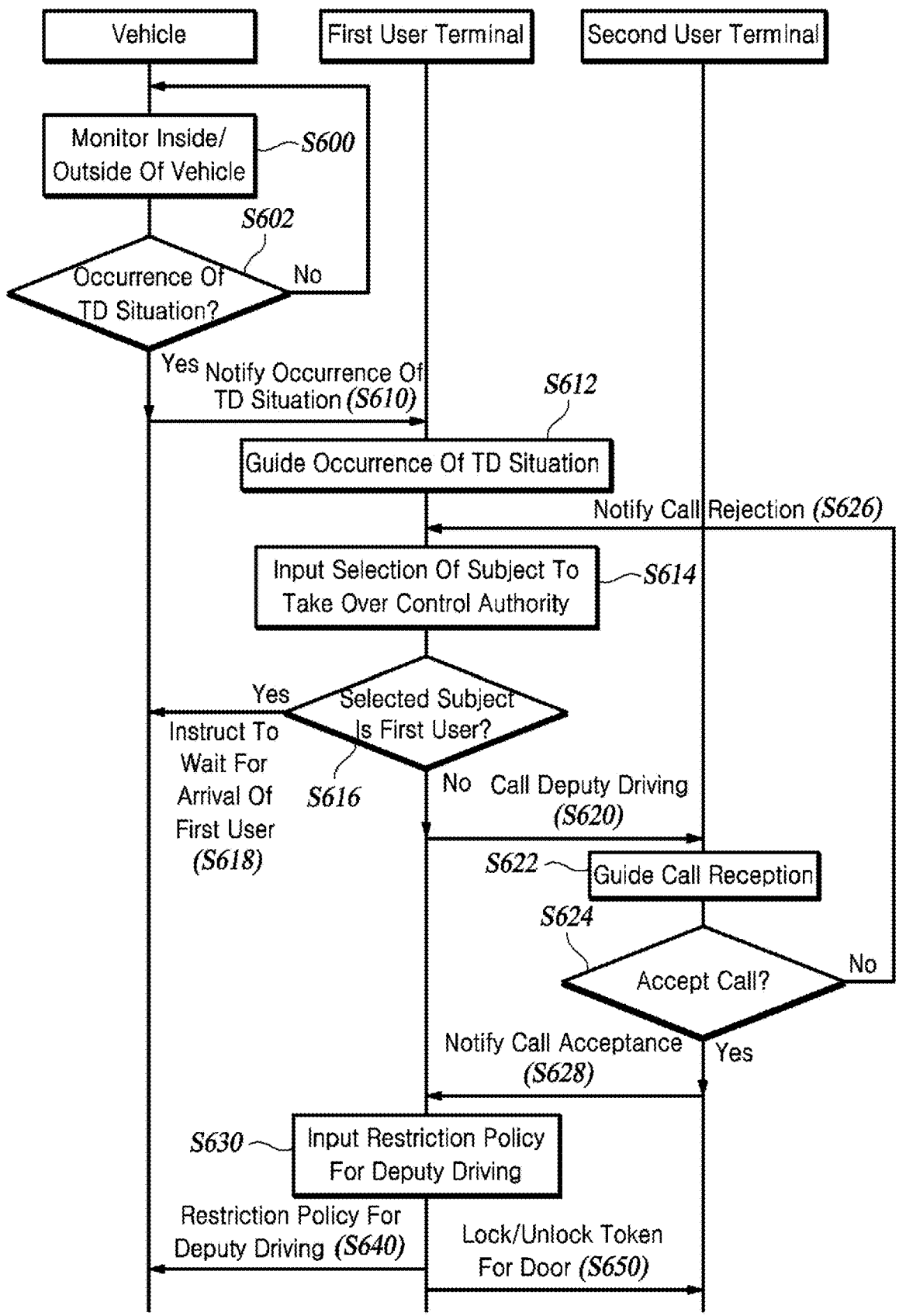
FIG. 6 is a flowchart illustrating a process of transferring control authority and setting authority.

FIG. 6 is a flowchart illustrating a process of transferring control authority and setting authority.

Figure 7:
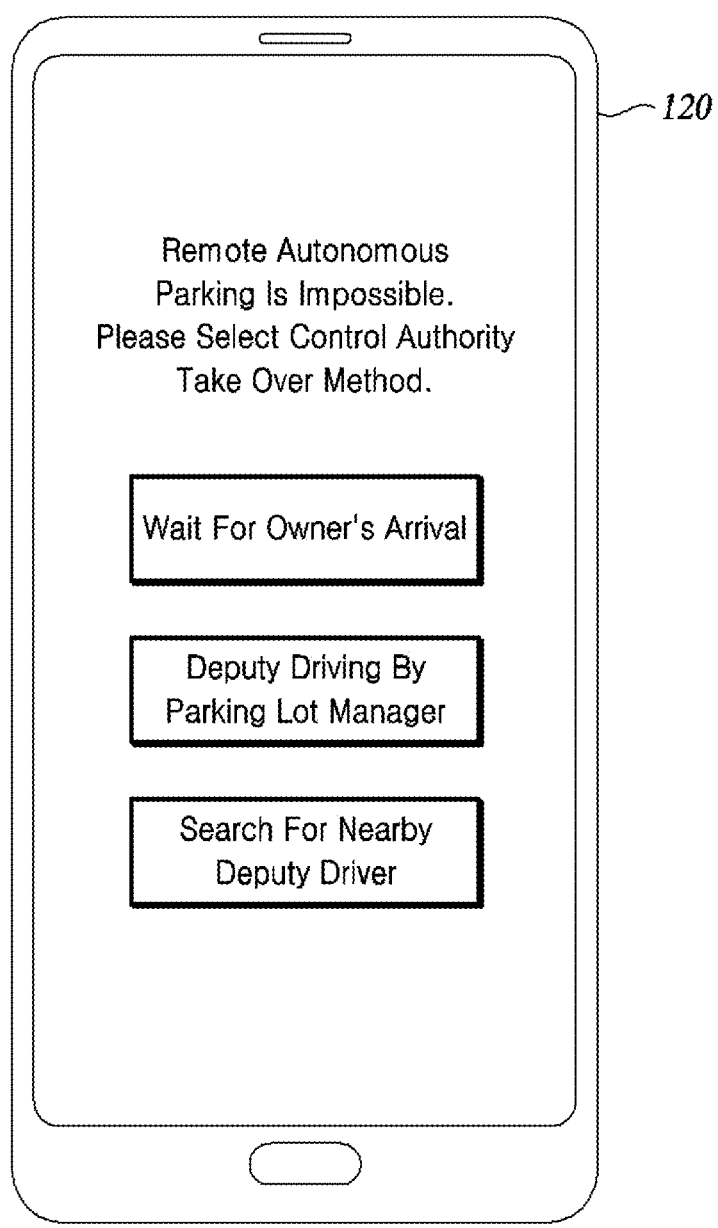
FIGS. 7 to 9 are diagrams illustrating exemplary screens that may be displayed on a user terminal when the operation described in FIG. 6 is performed.
Figure 8:
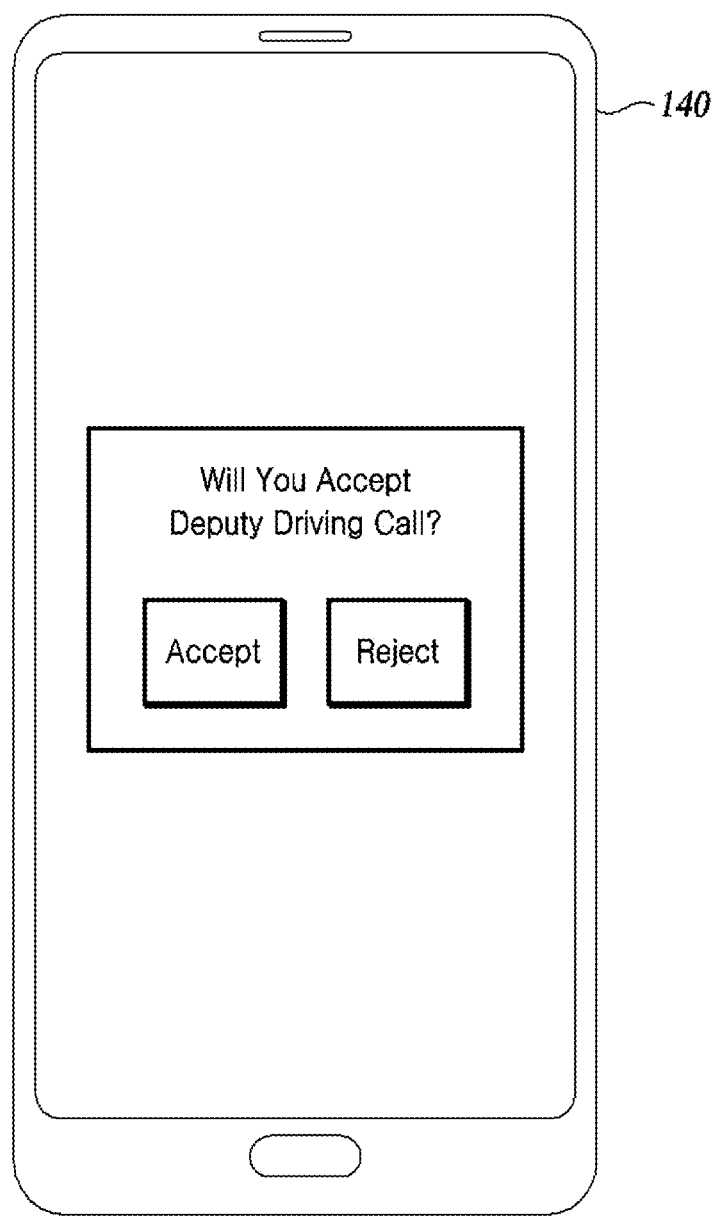
Figure 9:
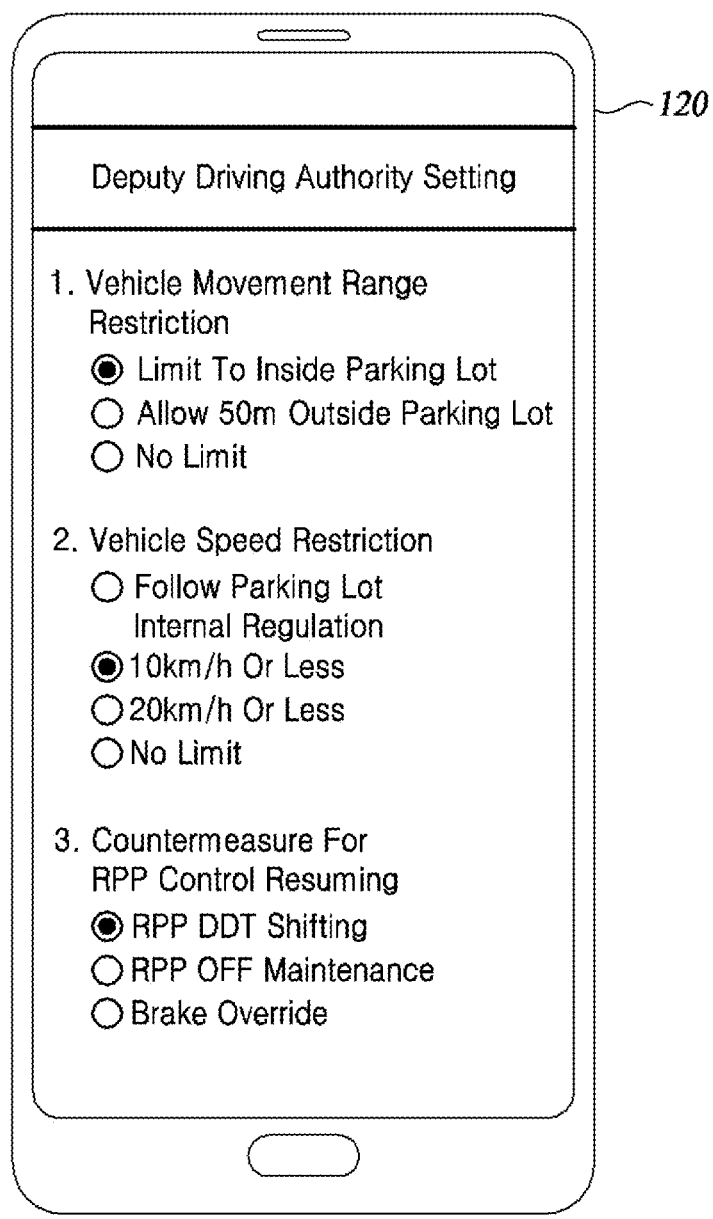

FIGS. 7 to 9 are diagrams illustrating exemplary screens that may be displayed on a user terminal when the operation described in FIG. 6 is performed.

The vehicle 100 may monitor internal and external conditions of the vehicle 100 while performing autonomous parking or autonomous vehicle exit (S600). The vehicle 100 may use information generated from various sensors to determine whether a TD situation in which autonomous parking or autonomous vehicle exit is unavailable (or not feasible) has occurred or whether a TD situation is anticipated to occur.

If a TD situation has occurred or is anticipated to occur (Yes in S602), the vehicle 100 may transmit a message notifying the first user terminal 120 that a TD situation has occurred while the first user 122 is absent (S610).

The first user terminal 120 may send guide information to the first user 122 to indicate that a TD situation has occurred (S612), and may receive a selection for a subject to which control authority is transferred from the first user 122 (S614). The first user terminal 120 may receive, via a user input interface, a selection of the subject to take over a control authority of the vehicle 100. To this end, the first user terminal 120 may output a screen configured to alternatively select the first user 122 or the second user 142 as a subject to which control authority is transferred on the display. For example, the first user 122 may select the first user 122, who may be an owner of vehicle 100, or the second user 142, who may be the parking lot manager or a nearby deputy driver, as the subject to which control authority is transferred through a screen as shown in FIG. 7.

If the first user 122 is selected as the subject to which control authority is transferred (Yes in S616), the first user terminal 120 may transmit to the vehicle 100 a message instructing to wait in a stopped state until the first user 122 arrives (S618).

On the other hand, if the second user 142 is selected as the subject to which control authority is transferred (No in S616), the first user terminal 120 may transmit a deputy driving call message to the second user terminal 140 (S620). For example, if the first user 122 selects a nearby deputy driver as the subject to which control authority is transferred, among the second user terminals 140 in which the application for deputy driving of the TD vehicle is installed, a deputy driving call message may be transmitted to the second user terminal 140 within a certain distance from the current location of the vehicle 100. As another example, if the first user 122 selects the parking lot manager as the subject to which control authority is transferred, a deputy driving call message may be transmitted to the second user terminal 140 that is pre-registered in the manager terminal of the parking lot where the vehicle 100 is currently located. To this end, information on the terminal of the parking lot manager may be pre-registered in a server operated in a service provider providing a deputy driving service for a TD vehicle and/or a server operated in a parking lot.

The second user terminal 140 may send guide information to the second user 142 to indicate that a deputy driving call request is received (S622), and may receive an input indicating whether to accept the call from the second user 142 (S624). For example, as shown in FIG. 8, the second user terminal 140 may display a screen configured to accept or reject a deputy driving call (e.g., in a pop-up form, but is not limited to this example).

If the second user rejects the call (No in S624), the second user terminal 140 may transmit a message notifying the call rejection to the first user terminal 120 (S626). Accordingly, the first user terminal 120 may notify the first user 122 that the call is rejected and request to reselect a subject to which control authority is transferred. In some implementations, the first user terminal 120 may deactivate some options when requesting reselection of the subject to which control authority is transferred. For example, if the parking lot manager is requested for deputy driving, but rejects the request, the first user terminal 120 may display a screen in which a button for selecting the parking lot manager as a subject to which control authority is transferred is deactivated.

If the second user accepts the call (Yes in S624), the second user terminal 140 may transmit a message notifying the call acceptance to the first user terminal 120 (S628).

In response to the selection of the second user 142 as the subject to take over a control authority of the vehicle 100 and/or in response to the call acceptance of the second user 142, the first user terminal 120 may receive a restriction policy for the deputy driving of the second user 142 from the first user 122 (S630). For example, as shown in FIG. 9, the first user terminal 120 may display a screen for setting limited authority to be granted to the second user 142. The first user 122 may set the authority of the second user 142 for multiple (e.g., three) items of limiting the vehicle movement range, limiting the vehicle speed, and resuming RPP control. The first user 122 may select a policy to be set for the second user among the detailed policies defined in advance for each item. Since the contents of the detailed policies for each item have been described above in Tables 1 to 4, repeated descriptions thereof are omitted.

If the setting of the restrictive policy is completed, the first user terminal 120 may transmit the set restrictive policy to the vehicle 100 (S640). the first user terminal 120 may transmit, to the vehicle 100, an indication of a limited control authority that authorizes a maneuver of the vehicle 100. The maneuver of the vehicle 100 is associated with the manual driving while the second user 142 is present in the vehicle 100. The first user terminal 120 may transmit a token for locking/unlocking the door of the vehicle 100 to the second user terminal 140 (S650). In some implementations, the first user terminal 120 may request token transmission to the vehicle 100 or a server (not shown). For example, the first user terminal 120 may request a token issuance to a server operated by an operator providing a service that mediates a vehicle in which a TD situation occurs and a deputy driver. The server may transmit the issued token and information capable of verifying it to the second user terminal 140 and the vehicle 100, respectively.

Figure 10:
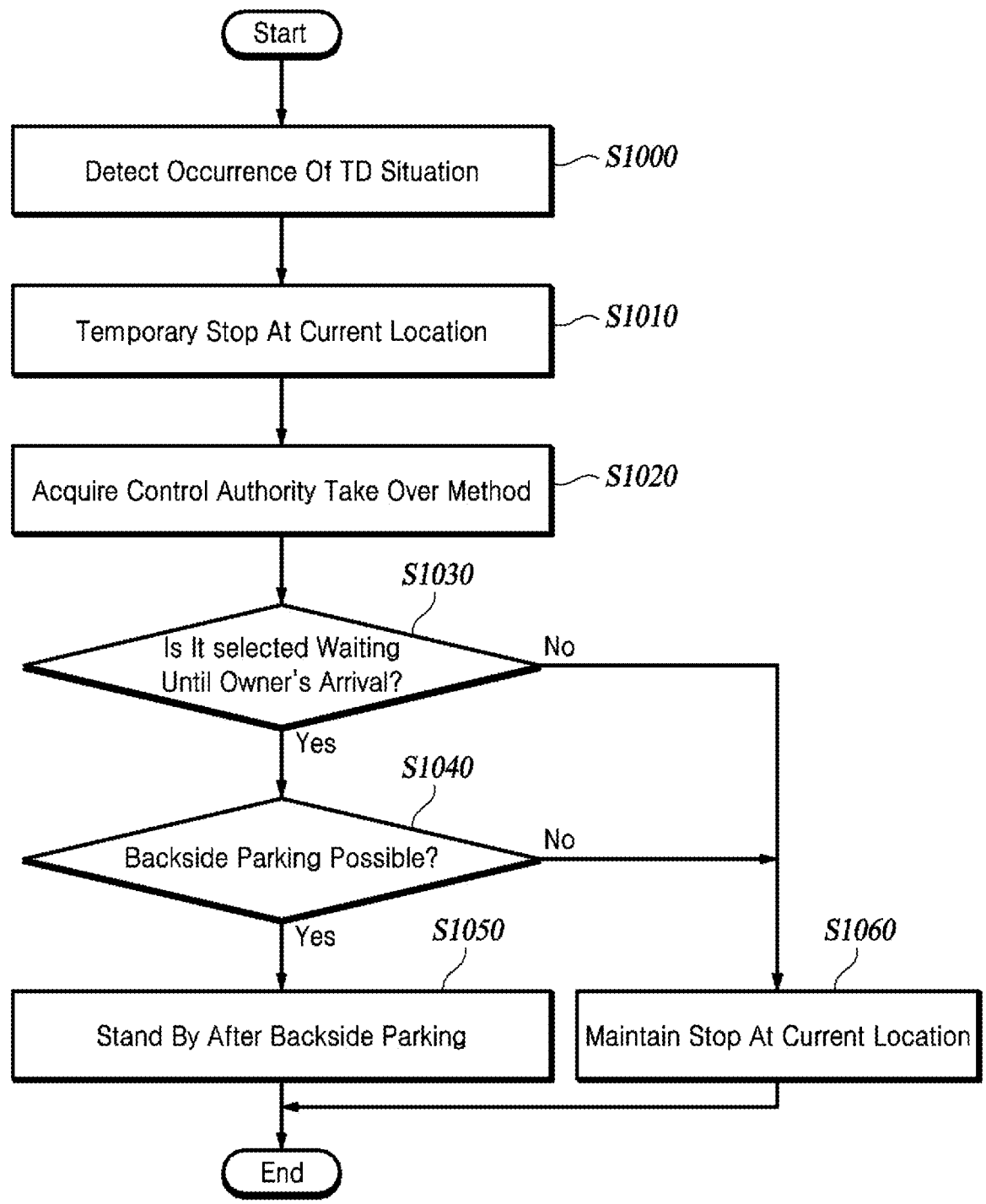
FIG. 10 is a flowchart for describing an operation of a vehicle when a TD situation occurs.

FIG. 10 is a flowchart for describing an operation of a vehicle when a TD situation occurs.

If the occurrence of a TD situation is detected (S1000), the vehicle 100 may temporarily stop (e.g., at the current location or a safe place within a preset distance from the current location) (S1010).

The vehicle 100 may acquire a control authority take over method (S1020). For example, the vehicle 100 may receive information indicating a control authority take over method selected by the first user 122 from among a plurality of control authority take over methods from the first user terminal 120. For example, the first user 122 may select any one of 'waiting for the owner's arrival', 'deputy driving by a parking lot manager', and 'searching for a nearby deputy driver' through the screen shown in FIG. 7. The 'waiting for an owner's arrival' method may be a method in which the first user 122 moves to the vehicle 100 and directly drives the vehicle 100 manually. The 'deputy driving by a parking lot manager' method may be a method of requesting deputy driving from the manager of the parking lot where the vehicle 100 is located. The 'nearby deputy driver search' method may be a method of requesting a deputy driver within a preset distance from the vehicle 100.

If the 'waiting for an owner's arrival' method is selected as the control authority take over method (Yes in S1030), the vehicle 100 may determine whether backside parking is possible in the parking lot (S1040). For example, the vehicle 100 may search for a space where backside parking is possible based on sensing data and/or a high-definition map, and determine whether a path to the searched space is generated and/or the generated path may be followed.

If it is determined that backside parking is possible (Yes in S1040), the vehicle 100 may wait until the first user 122 arrives after performing autonomous parking control for backside parking (S1050). The vehicle 100 may wait for the first user 122 in a neutral parked state (N stage stopped).

On the other hand, if it is determined that backside parking is unavailable or not feasible (No in S1040), the vehicle 100 may wait at the current location until the first user 122 arrives (S1060). The vehicle 100 may wait for the first user 122 in a stop state of a parking stage (P stage stop).

Figure 11:
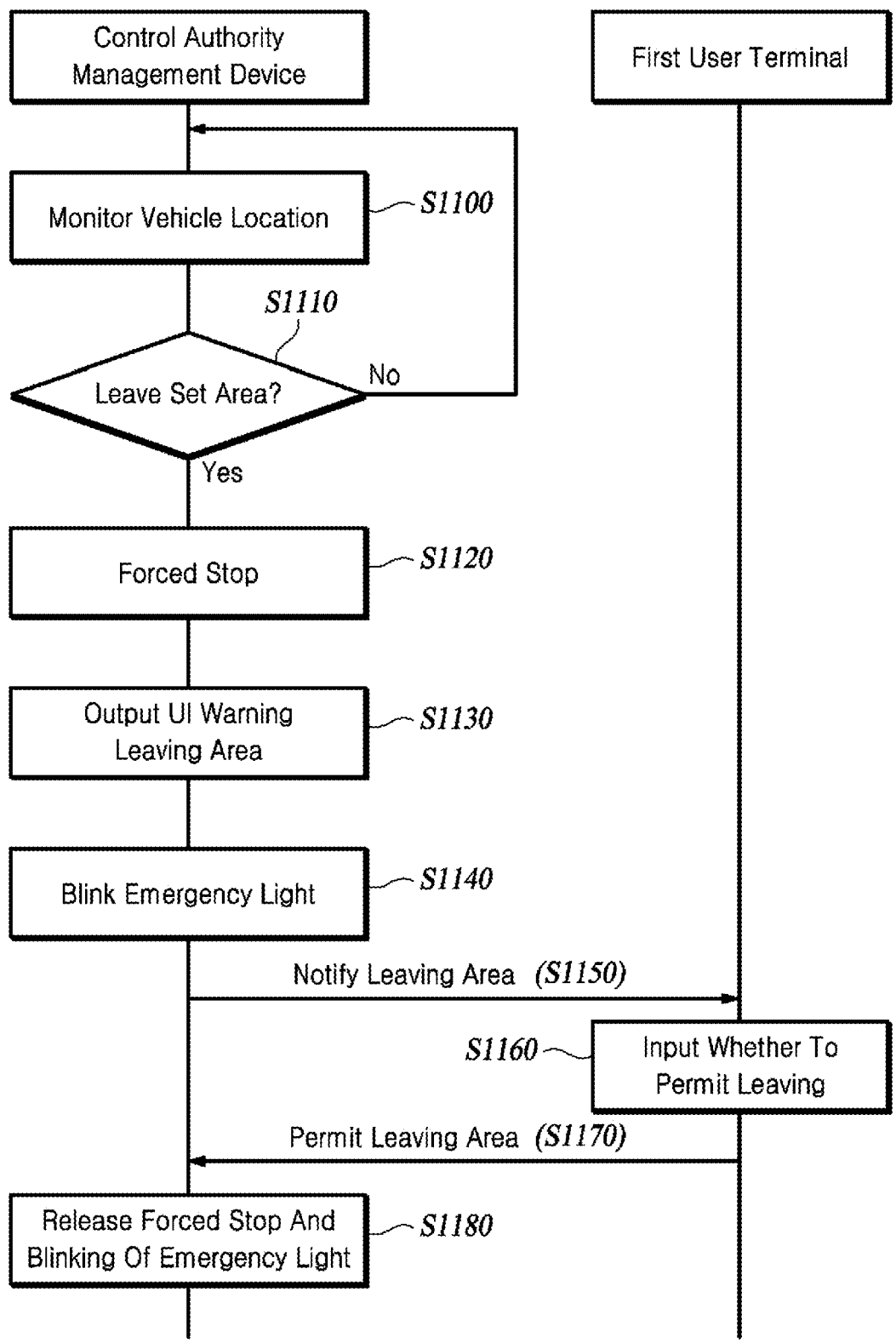
FIG. 11 is a flowchart illustrating a process of controlling a vehicle based on a movement range restriction policy.

FIG. 11 is a flowchart illustrating a process of controlling a vehicle based on a movement range restriction policy.

Figure 12:
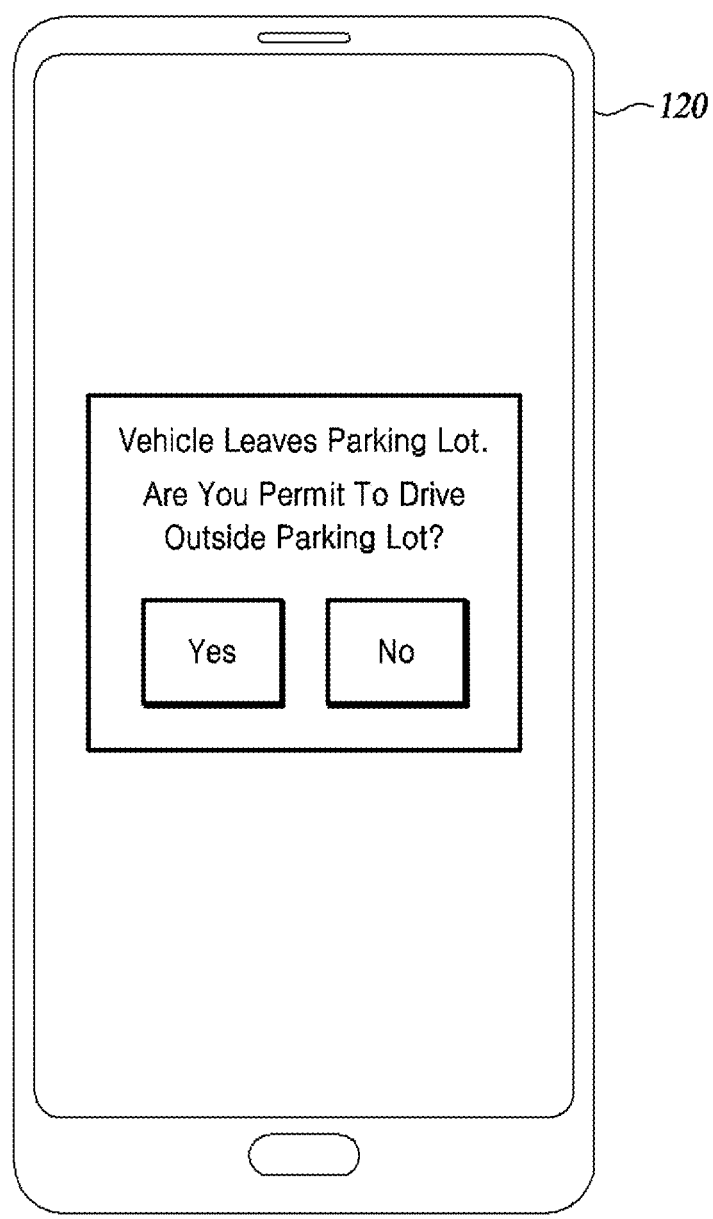
FIG. 12 is an exemplary diagram illustrating an exemplary screen that may be displayed on a user terminal when the operation described in FIG. 11 is performed.

FIG. 12 is an exemplary diagram illustrating an exemplary screen that may be displayed on a user terminal when the operation described in FIG. 11 is performed.

While the second user 142 manually drives the vehicle 100, the control authority management device 280 may monitor the location of the vehicle 100 (S1100). The control authority management device 280 may selectively monitor the location of the vehicle 100 (e.g., only when the movement range restriction policy is set to permit the second user 142 to drive only within a predetermined area). For example, in the example of FIG. 9, when 'limit to inside parking lot' or '50 m outside parking lot' is selected as the movement range restriction policy for the second user 142, the control authority management device 280 may monitor the real-time location of the vehicle 100.

If the location of the vehicle 100 is out of the area set by the movement range restriction policy due to manual driving by the second user 142 (Yes in S1110), the control authority management device 280 may control to stop the vehicle 100 forcibly (S1120).

The control authority management device 280 may control the user interface device 210 to display a warning message indicating that the vehicle 100 leaves the area. For example, the control authority management device 280 may transmit a signal instructing a display device provided inside the vehicle 100 to display a screen including a warning message. The warning message may include, for example, "the vehicle is out of the parking lot. driving is possible when driving outside the parking lot is permitted" and a predetermined sentence.

The control authority management device 280 may control the emergency light of the vehicle 100 to blink (S1140). For example, the control authority management device 280 may transmit a signal instructing the blinking of an emergency light to the driving control device 250. The emergency light may blink at regular intervals until a second message to be described later is received.

The control authority management device 280 may transmit a first message notifying the vehicle 100 leaving the area to the first user terminal 120 through the communication device 220 (S1150).

The first user terminal 120 may receive an input from the first user 122 whether to permit the vehicle 100 to leave the area. For example, as shown in FIG. 12, the first user terminal 120 may display a screen configured to select whether or not to permit the vehicle 100 to leave the area. The first user 122 may permit or prohibit a vehicle driven by the second user 142 from leaving a set area through a screen displayed on the first user terminal 120.

If the first user 122 permits the leaving the area, the first user terminal 120 may transmit a second message notifying that leaving the area is permitted to the vehicle 100 (S1170).

In response to the second message, the control authority management device 280 may release the forcible stop of the vehicle 100 and the blinking of the emergency lights (S1180).

Figure 13:
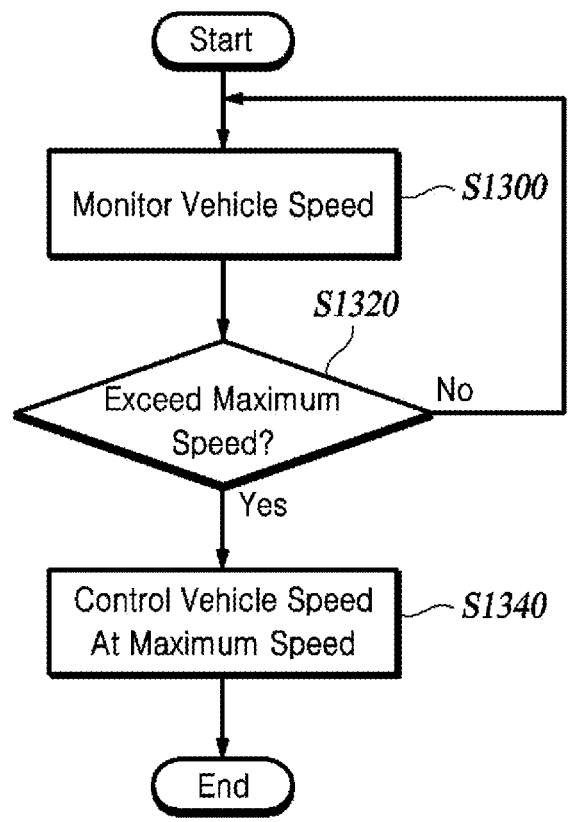
FIG. 13 is a flowchart illustrating a process of controlling a vehicle based on a vehicle speed restriction policy.

FIG. 13 is a flowchart illustrating a process of controlling a vehicle based on a vehicle speed restriction policy.

While the second user 142 manually drives the vehicle 100, the control authority management device 280 may monitor the speed of the vehicle 100 (S1300). The control authority management device 280 may selectively monitor the speed of the vehicle 100 (e.g., only when the vehicle speed restriction policy is set to permit the second user 142 to drive only at or below a predetermined maximum speed). For example, in the example of FIG. 9, when 'flow parking lot internal regulation', '10 km/h or less', or '20 km/h or less' is set as the vehicle speed restriction policy for the second user 142, the control authority management device 280 may monitor the real-time speed of the vehicle 100.

The control authority management device 280 may identify whether the speed of the vehicle 100 exceeds the maximum speed set in the restriction policy (S1320).

If it is determined that the maximum speed is exceeded, the control authority management device 280 may control the speed of the vehicle 100 to be the maximum speed set in the restriction policy (S1340). For example, when '10 km/h or less' is set as the vehicle speed restriction policy for the second user 142, the control authority management device 280 may transmit a signal instructing the driving control device 250 to control the speed of the vehicle 100 to be 10 km/h.

Figure 14:
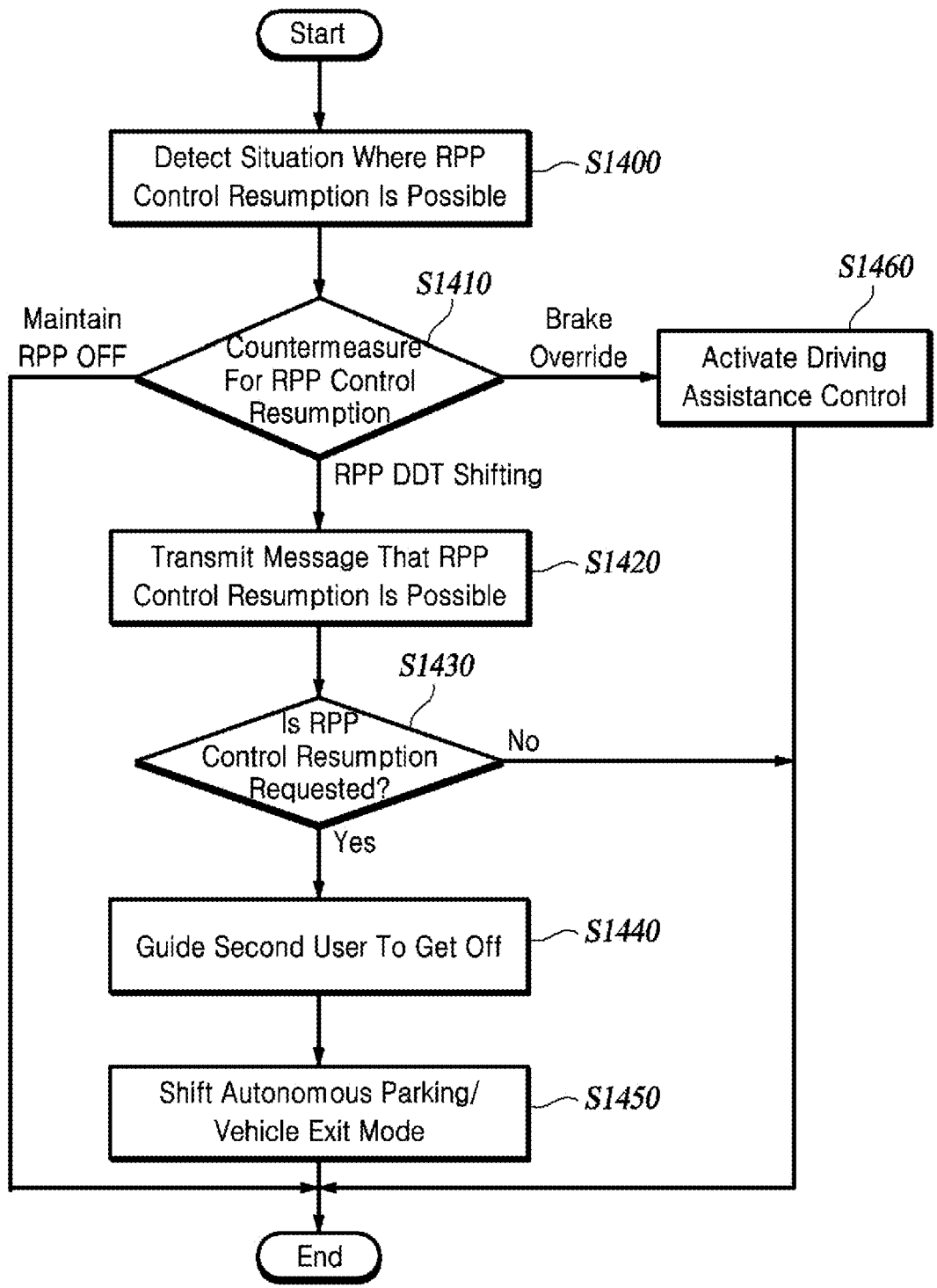
FIG. 14 is a flowchart illustrating a process in which a vehicle is controlled based on a countermeasure policy when a TD situation is resolved.

FIG. 14 is a flowchart illustrating a process in which a vehicle is controlled based on a countermeasure policy when a TD situation is resolved.

The control authority management device 280 may detect a situation in which a resumption of control by the RPP controller 260 (hereinafter referred to as RPP control) is possible (S1400). A situation in which the resumption of RPP control is possible may include, for example, a case where a TD situation in which remote autonomous parking or remote autonomous vehicle exit is unavailable (or not feasible) is resolved. For example, if an obstacle obstructing remote autonomous parking or remote autonomous vehicle exit of the vehicle 100 disappears, the control authority management device 280 may determine that the resumption of RPP control is possible. As another example, if the foreign matter attached to the sensor is removed, the control authority management device 280 may determine that the resumption of the RPP control is possible.

The control authority management device 280 may identify the set value of the countermeasure policy for the situation in which the RPP control may be resumed (S1410).

If the 'RPP DDT shifting' method is set as the countermeasure policy, the control authority management device 280 may transmit a first message notifying that the RPP control may be resumed to the first user terminal 120 (S1420). Accordingly, the first user terminal 120 may receive an input of whether to resume RPP control from the first user. The first user terminal 120 may transmit a second message requesting resumption of RPP control to the vehicle 100 based on the input of the first user 122.

If the second message is received from the first user terminal 120 (Yes in S1430), the control authority management device 280 may send guide information to the second user to indicate that the second user need to get off the vehicle 100 (S1440). For example, the control authority management device 280 may transmit a signal instructing a display device (e.g., provided inside the vehicle 100) to display a screen including a getting off guidance message. The getting off guidance message may include, for example, "RPP control will be resumed. Please get off after shifting to P" and a predetermined sentence.

If the second user's getting off is detected, the control authority management device 280 may shift the operation mode of the vehicle 100 from the manual driving mode to the autonomous parking mode (or autonomous vehicle exit mode) (S1450). Accordingly, the control by the RPP controller 260 may be resumed.

If a 'brake override' method is set as the countermeasure policy, the control authority management device 280 may activate the driving assistance control function (S1460). If a collision of the vehicle 100 is anticipated by manipulation of the second user 142, the ADAS controller 270 may control the vehicle 100 to decelerate or stop the vehicle 100.

Figure 15:
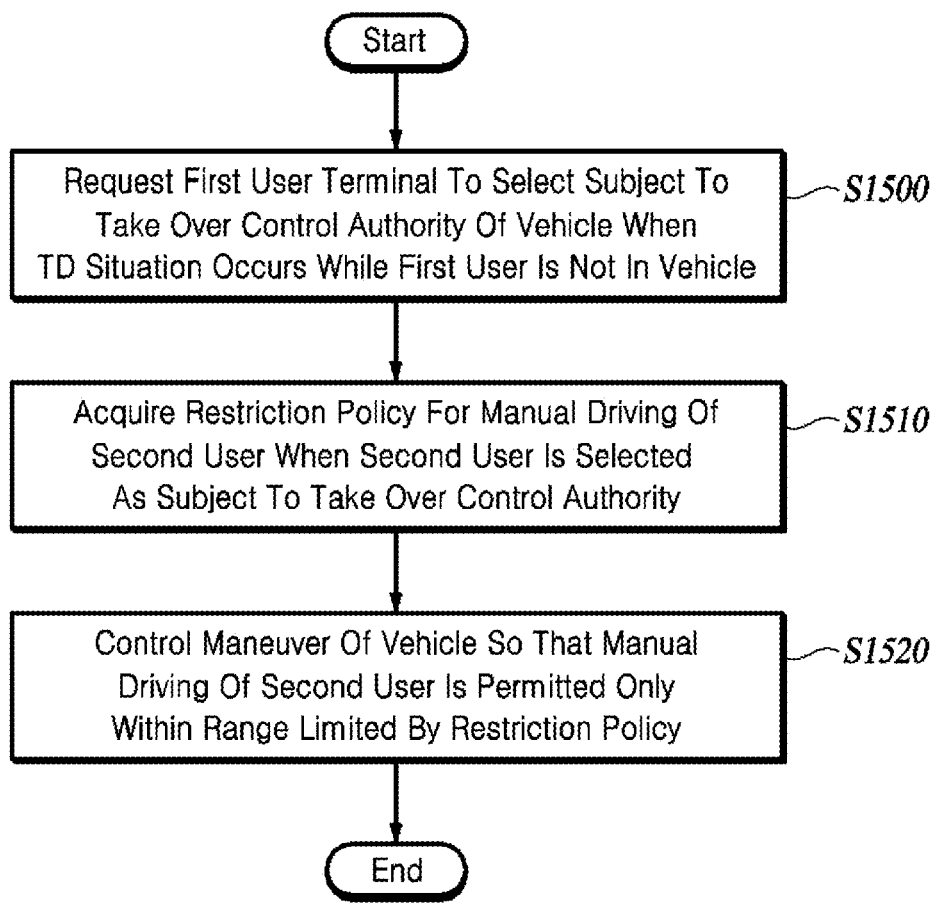
FIG. 15 is a flowchart illustrating a method for controlling a vehicle.

FIG. 15 is a flowchart illustrating a method for controlling a vehicle.

If a TD situation occurs while the first user 122 is not in the vehicle 100, the control authority management device 280 may request the first user terminal 120 to select the subject to take over a control authority of the vehicle 100 (S1500). For example, the control authority management device 280 may transmit, to the first user terminal 120, a request message including an indication for the first user 122 to select the subject to take over the control authority of the vehicle 100. The first user 122 may be a person who has the administrative control authority (e.g., full control authority) for the vehicle 100. The TD situation may include a situation in which autonomous parking or autonomous vehicle exit of the vehicle 100 is unavailable or not feasible.

If the second user 142, not the first user 122, is selected as the subject to take over the control authority of the vehicle 100, the control authority management device 280 may acquire a restriction policy for manual driving of the vehicle by the second user 142 (S1510). The second user 142 may be a manager of a parking lot where the vehicle 100 is located or a deputy driver within a preset distance from the vehicle 100. The control authority management device 280 may receive, from the first user terminal 120, an indication of a limited control authority that authorizes a maneuver of the vehicle 100. The maneuver of the vehicle 100 is associated with the manual driving while the second user 142 is present in the vehicle 100.

For example, the restriction policy for the manual driving of the second user 142 may include a movement range restriction policy permitting driving of the vehicle 100 (e.g., only within an area set by the first user 122). The control authority management device 280 may receive, form the first user terminal 120, a policy message indicating the movement range restriction policy. The movement range restriction policy may be selected by the first user 122 from among a plurality of candidate movement range restriction policies. The plurality of candidate moving range restriction policies may include all or part of a first movement range restriction policy (e.g., that permits driving of the vehicle 100 by the second user 142 only within the parking lot where the vehicle 100 is currently located), a second movement range restriction policy (e.g., that permits driving of the vehicle 100 by the second user 142 only within the parking lot and a preset distance from the parking lot), and a third movement range restriction policy that does not limit the movement range of the vehicle 100.

As another example, the restriction policy for the manual driving of the second user 142 may include a vehicle speed restriction policy permitting the vehicle 100 to drive only at or below a speed set by the vehicle 100 or a speed indicate by a policy message received form the first user terminal 120. The control authority management device 280 may receive, form the first user terminal 120, a policy message indicating the vehicle speed restriction policy. The vehicle speed restriction policy may be selected by the first user 122 from among a plurality of candidate vehicle speed restriction policies. The plurality of candidate vehicle speed restriction policies may include all or part of a first vehicle speed restriction policy that permits driving of the vehicle 100 only at or below a first maximum (e.g., a speed defined according to internal regulation of the parking lot where the vehicle 100 is currently located), a second vehicle speed restriction policy permitting driving of the vehicle 100 only at or below a predefined second maximum speed, and a third vehicle speed restriction policy that does not limit the speed of the vehicle 100.

As another example, the policy for restricting the manual driving of the second user 142 may include a countermeasure policy of the vehicle 100 when the TD situation is resolved. The countermeasure policy may include one or more criterions for resuming autonomous driving operation of the vehicle 100. The countermeasure policy may refer to an autonomous driving resumption policy. The control authority management device 280 may receive, form the first user terminal 120, a policy message indicating the countermeasure policy. The countermeasure policy may be selected by the first user 122 from among a plurality of candidate countermeasure policies. The plurality of candidate countermeasure policies may include all or part of a first countermeasure policy selectively resuming autonomous parking control or autonomous vehicle exit control for the vehicle 100 based on an authorization message (or an instruction message) received from the first user terminal 120, a second countermeasure policy that activates the auxiliary control function (e.g., a driving assistance control function) for manual driving of the second user 142, and a third countermeasure policy maintaining the manual driving of the second user 142 to be permitted within the range limited by the restriction policy even if the TD situation is resolved.

The control authority management device 280 may receive, from the first user device 120, information of the second user 142 and may store the received information. The information of the second user 142 may comprise an indication that the second user 142 is a driver for whom a limited control authority associated with the vehicle 100 can be granted.

Based on a limited control authority granted to the second user 142 and based on a determination that the second user 142 is present in the vehicle 100, The control authority management device 280 may control the maneuver of the vehicle 100 within a range indicated by the acquired restriction policy (S1520). The control authority management device 280 may determine whether the second user 142 is present in the vehicle 100 by communicating with a second user terminal 140 or face recognition or any other methods.

For example, the control authority management device 280 may forcibly stop the vehicle 100 when the vehicle 100 leaves the area set by the first user 122. Additionally, the control authority management device 280 may control the internal display device of the vehicle 100 to display a warning message indicting that the vehicle 100 leaves the area. The control authority management device 280 may transmit, to the first user terminal 120, a message indicating that the vehicle 100 leaving the area. The first user terminal 120 may transmit a message indicating whether the vehicle 100 is permitted to leave the area. For example, the control authority management device 280 may receive, from the first user terminal 120, a permission message indicating that the vehicle 100 is permitted to leave the area. The control authority management device 280 may control an emergency light of the vehicle 100 to blink until receiving the permission message. The control authority management device 280 may release the forced stop of the vehicle 100 based on the reception of the permission message. The control authority management device 280 may turn off the emergency light of the vehicle 100 before receiving the permission message.

As another example, the control authority management device 280 may resume, based on the countermeasure policy and based on a determination that a resumption of autonomous driving of the vehicle 100 is feasible, an autonomous driving operation of the vehicle 100. If the first countermeasure policy is selected as the above-described countermeasure policy, the control authority management device 280 may transmit, to the first user terminal 120, a message indicating that autonomous parking control or autonomous vehicle exit control for the vehicle 100 is able to be resumed. The control authority management device 280 may transmit the message in response to detecting the resolution of the TD situation. If a request is received from the first user terminal 120 to resume autonomous parking control or autonomous vehicle exit control for the vehicle 100, the control authority management device 280 may instruct the second user 142 to get off the vehicle 100. For example, the control authority management device 280 may output, based on an authorization message instructing a resumption of the of the autonomous parking control or autonomous vehicle exit control for the vehicle 100, a guide message instructing the second user 142 to get off the vehicle 100. Based on a determination that the second user 142 is no longer present in the vehicle 100, the control authority management device 280 may resume autonomous parking control or autonomous exit control of the vehicle 100.

As another example, if the second countermeasure policy is selected as the above described countermeasure policy, the control authority management device 280 may activate a driving assistance control function for the second user's manual driving. The control authority management device 280 may activate the driving assistance control function in response to detecting the resolution of the TD situation. After the TD situation is resolved, the control authority management device 280 may the vehicle 100 to decelerate or stop based on a collision risk while the second user 142 is driving the vehicle 100. For example, if it is anticipated that the vehicle 100 will collide with the surrounding obstacles due to the manipulation of the second user, the control authority management device 280 may control the vehicle 100 to decelerate or stop the vehicle 100.

In process S1500, if the first user 122 is selected as the subject to which the control authority of the vehicle 100 is transferred, the control authority management device 280 may have the vehicle 100 stand by in a stopped state until the first user 122 arrives. For example, the control authority management device 280 may keep the vehicle 100 in a stopped state based on a message received from the first user terminal 120. The message may indicate that the first user 122 is selected as a subject to take over the control authority of the vehicle 100. Prior to waiting for the first user 122, the control authority management device 280 may determine whether the vehicle 100 is able to be double-parked. If it is determined that the vehicle 100 is able to be double-parked, the control authority management device 280 may perform autonomous parking control for the double-parking. On the other hand, if it is determined that double-parking is unavailable or not feasible, the control authority management device 280 may have the vehicle 100 stand by in a stopped state at the current location.

The flowchart/timing diagram of the present specification describes that the first user terminal 120 (e.g., directly) transmits/receives data to/from the vehicle 100 and/or the second user terminal 140 as an example, but aspects of the present disclosure are not limit thereto. For example, the first user terminal 120 may communicate with the vehicle 100 and/or the second user terminal 140 via a network (e.g., via the parking lot control server or the deputy driving service server).

According to one or more aspects of the disclosure, if a TD situation occurs while a person having authority over a vehicle is not on board, limited authority over the vehicle may be delegated to another entity (e.g., the second user terminal). Accordingly, it is possible to prevent vehicle theft or dangerous driving by other users. Further, if the TD situation is resolved, the autonomous parking, autonomous vehicle exit or driving assistance function may be reactivated.

The features of the present disclosure are not limited to the features mentioned above, and other features not mentioned will be clearly understood by those skilled in the art from the description above.

Each component of the apparatus or method according to the present disclosure may be implemented as hardware or software, or a combination of hardware and software. Furthermore, the function of each component may be implemented as software and a microprocessor may be implemented to execute the function of software corresponding to each component.

Various implementations of systems and techniques described herein may be realized as digital electronic circuits, integrated circuits, field programmable gate arrays (FPGAs), application-specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications, or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as a read-only memory (ROM), compact disk ROM (CD-ROM), magnetic tape, floppy disk, memory card, hard disk, magneto-optical disk, or storage device, and may further include a transitory medium such as a data transmission medium. In addition, the computer-readable recording medium may be distributed in a computer system connected via a network, so that computer-readable codes may be stored and executed in a distributed manner.

The flowchart/timing diagram of the present specification describes that processes may be sequentially executed, but this is merely illustrative of the technical idea of the present disclosure. In other words, since it is apparent to those having ordinary skill in the art that an order described in the flowchart/timing diagram may be changed or one or more processes may be executed in parallel without departing from the gist of the present disclosure, the flowchart/timing diagram is not limited to a time-series order.

Although various examples of the present disclosure have been described for illustrative purposes, those having ordinary skill in the art should appreciate that various modifications, additions, and substitutions are possible, without departing from the idea and scope of the claimed disclosure. Therefore, the illustrated embodiment(s) of the present disclosure have been described for the sake of brevity and clarity. The scope of the technical idea of the present embodiment(s) is not limited by the illustrations. Accordingly, one of ordinary skill in the art would understand that the scope of the claimed disclosure is not to be limited by the above explicitly described embodiment(s) but by the claims and equivalents thereof.

What is claimed is:

1. A method, performed by a device mounted on a vehicle, comprising:
    based on an event in which an autonomous driving operation is not feasible, transmitting, to a first user terminal having an administrative control authority associated with the vehicle, a request message, wherein the request message comprises an indication for a first user of the first user terminal to select a subject to take over a control authority of the vehicle while the first user is not present in the vehicle;
    acquiring a restriction policy for manual driving of the vehicle by a second user, wherein the second user other than the first user is selected as the subject to take over the control authority; and
    controlling, based on a limited control authority granted to the second user and based on a determination that the second user is present in the vehicle, a maneuver of the vehicle within a range indicated by the restriction policy.

2. The method of claim 1, further comprising:
    storing, in a memory of the vehicle, information of the second user, wherein the second user is a manager of a parking lot where the vehicle is located or a deputy driver within a preset distance from the vehicle, and wherein the information of the second user comprises an indication that the second user is one of at least one candidate driver for whom a limited control authority associated with the vehicle can be granted.

3. The method of claim 1, wherein the event comprises a situation in which autonomous parking or autonomous vehicle exit of the vehicle is unavailable or not feasible.

4. The method of claim 1, wherein the restriction policy comprises a policy permitting driving of the vehicle only within an area set by the first user.

5. The method of claim 4, wherein the controlling the maneuver of the vehicle comprises:
    stopping the vehicle when the vehicle leaves the set area; and
    transmitting, to the first user terminal, a message indicating that the vehicle is leaving the area.

6. The method of claim 5, wherein the controlling the maneuver of the vehicle further comprises:
    controlling an internal display device of the vehicle to display a message indicating that the vehicle leaves the set area.

7. The method of claim 1, wherein:
    the acquiring the restriction policy comprises receiving, from the first user terminal, a movement range restriction policy from among a plurality of candidate movement range restriction policies,
    the plurality of candidate movement range restriction polices comprises at least one of:
        a first policy permitting driving of the vehicle by the second user only within a parking lot where the vehicle is currently located;
        a second policy permitting driving of the vehicle by the second user only within the parking lot and a preset distance from the parking lot; or
        a third policy that does not limit a range of movement of the vehicle.

8. The method of claim 1, wherein the restriction policy comprises a policy permitting the vehicle to drive only at or below a speed set by the vehicle or a speed indicated by a message received from the first user terminal.

9. The method of claim 1, wherein:
the acquiring the restriction policy comprises receiving, from the first user terminal, a speed restriction policy from among a plurality of candidate speed restriction policies,
the plurality of candidate speed restriction policies comprises at least one of:
a first policy permitting driving of the vehicle only at or below a first maximum speed defined according to an internal regulation of a parking lot where the vehicle is currently located;
a second policy permitting driving of the vehicle only at or below a predefined second maximum speed; or
a third policy that does not limit a speed of the vehicle.

10. The method of claim 1, further comprising:
resuming, based on a second policy and based on a determination that a resumption of autonomous driving of the vehicle is feasible, an autonomous driving operation of the vehicle, wherein the second policy comprises one or more criterions for resuming autonomous driving operation of the vehicle.

11. The method of claim 10, wherein:
the second policy is set to selectively resume autonomous parking control or autonomous vehicle exit control for the vehicle,
the controlling the maneuver of the vehicle comprises:
transmitting, to the first user terminal, a message indicating that the autonomous parking control or autonomous vehicle exit control for the vehicle is able to be resumed; and
outputting, based on an authorization message instructing a resumption of the autonomous parking control or autonomous vehicle exit control for the vehicle, a guide message instructing the second user to get off the vehicle.

12. The method of claim 11, wherein the resuming the autonomous driving operation of the vehicle comprises:
resuming, based on a determination that the second user is no longer present in the vehicle, the autonomous parking control or autonomous vehicle exit control for the vehicle.

13. The method of claim 10, wherein:
the second policy is set to activate a driving assistance control function for manual driving of the second user, and
the controlling the maneuver of the vehicle comprises controlling the vehicle to decelerate or stop based on a collision risk while the second user is driving the vehicle.

14. The method of claim 1, wherein:
the acquiring the restriction policy comprises acquiring an autonomous driving resumption policy from among a plurality of candidate autonomous driving resumption policies,
the plurality of autonomous driving resumption polices comprises at least one of:
a first policy selectively resuming autonomous parking control or autonomous vehicle exit control for the vehicle based on an instruction message of the first user terminal;
a second policy activating a driving assistance control function for manual driving of the second user; or
a third policy maintaining the manual driving of the second user within a range limited by the restriction policy.

15. The method of claim 1, further comprising:
keeping the vehicle in a stopped state based on a message received from the first user terminal, wherein the message indicates that the first user is selected as a subject to take over the control authority of the vehicle.

16. The method of claim 15, wherein the keeping the vehicle in the stopped state comprises:
keeping the vehicle in the stopped state after performing, based on a determination that the vehicle is able to be double-parked, autonomous parking control for double-parking; or
keeping, based on a determination that the vehicle is unable to be double-parked, the vehicle in the stopped state at a current location.

17. An apparatus for a vehicle, the apparatus comprising:
at least one processor; and
a memory storing instructions that, when executed by the at least one processor, cause the apparatus to:
based on an event in which an autonomous driving operation is not feasible, transmit, to a first user terminal having an administrative control authority associated with the vehicle, a request message, wherein the request message comprises an indication for a first user of the first user terminal to select a subject to take over a control authority of the vehicle while the first user is not present in the vehicle;
acquire a restriction policy for manual driving of the vehicle by a second user, wherein the second user other than the first user is selected as the subject; and
control, based on a limited control authority granted to the second user and based on a determination that the second user is present in the vehicle, a maneuver the vehicle within a range indicated by the restriction policy.

18. A method performed by a terminal of a first user, the method comprising:
receiving, from a vehicle, a message indicating an event in which an autonomous driving operation is not feasible;
receiving, via a user input interface of the terminal of the first user, a selection of a second user as a subject to take over a control authority of the vehicle, wherein the terminal has an administrative control authority associated with the vehicle;
receiving, based on the selection of the second user, a restriction policy for manual driving of the vehicle by the second user; and
transmitting, to the vehicle, an indication of a limited control authority that authorizes a maneuver of the vehicle, wherein the maneuver of the vehicle is associated with the manual driving while the second user is present in the vehicle.

19. The method of claim 18, wherein the restriction policy comprises a policy permitting driving of the vehicle only within an area set by the first user, and
wherein the method further comprises:
receiving, from the vehicle, a first message indicating that the vehicle leaves the set area; and
transmitting, to the vehicle, a second message indicating whether the vehicle is permitted to leave the set area.

20. The method of claim 18, wherein the restriction policy comprises a policy resuming autonomous parking control or autonomous vehicle exit control for the vehicle based on an instruction message of the terminal of the first user, and
wherein the method further comprises:
receiving a message indicating that the autonomous parking control or autonomous vehicle exit control for the vehicle is able to be resumed; and transmitting, to the vehicle, the instruction message indicating whether to resume autonomous parking control or autonomous vehicle exit control for the vehicle.

\* \* \* \* \*